United States Patent [19]
Stapleton

[11] Patent Number: 5,835,546
[45] Date of Patent: Nov. 10, 1998

[54] SYSTEM FOR SEATING AT LEAST ONE GASKET IN A PRESSURE VESSEL PENETRATION WHERE A COLUMN PENETRATES TELESCOPICALLY

[76] Inventor: Cecil R. Stapleton, 4770 Anchor La., Pensacola, Fla. 32514

[21] Appl. No.: 683,225

[22] Filed: Jul. 18, 1996

[51] Int. Cl.$^6$ .......................... G21C 17/00; G21C 13/028
[52] U.S. Cl. .......................... 376/203; 277/11; 376/247; 376/258; 374/208
[58] Field of Search .............................. 73/866.5; 277/11; 29/407.05; 376/203, 247, 249, 250, 258; 374/141, 208

[56] References Cited

U.S. PATENT DOCUMENTS

| | | | |
|---|---|---|---|
| 3,926,722 | 12/1975 | Dupen | 376/205 |
| 4,655,483 | 4/1987 | Margotta | 285/169 |
| 4,812,285 | 3/1989 | Stapleton | 376/203 |
| 4,885,122 | 12/1989 | Stapleton | 976/DIG. 173 X |
| 5,084,228 | 1/1992 | Lhwillier | 376/203 |
| 5,375,458 | 12/1994 | Oliver et al. | 376/250 X |
| 5,426,676 | 6/1995 | Hopkins | 376/203 |
| 5,426,680 | 6/1995 | Willems | 376/258 |
| 5,465,497 | 11/1995 | Kowdley et al. | 376/258 X |
| 5,487,532 | 1/1996 | Lonardi et al. | 266/271 |
| 5,524,030 | 6/1996 | White et al. | 376/258 X |
| 5,531,102 | 7/1996 | Brookfield et al. | 73/54.32 |
| 5,619,546 | 4/1997 | Porter et al. | 376/203 X |

OTHER PUBLICATIONS

*Patent Abstracts of Japan* Grp. M1314, vol. 16, No. 456 (4–161602) "Telescopic Coupling Device Mounting Method" Abs pub date Sep. 22, 1992.

*Patent Abstracts of Japan* "Pressure Vessel" Abstract of (7–318683) dated Dec. 8, 1995.

*Primary Examiner*—Thomas P. Noland
*Attorney, Agent, or Firm*—Pravel, Hewitt, Kimball & Krieger

[57] ABSTRACT

A system for seating at least one gasket member used to seal a pressure vessel penetration where a column penetrates therethrough includes a tubular member, a column which penetrates through the tubular member in a telescoping manner and is normally movable axially relative to and in axial sliding communication with the tubular member before assembly of hardware used to seat the gasket member, and at least one gasket member for sealing the interfaces between the tubular member and the column. The system also includes spacer for filling the axial gap in series with at least one properly seated gasket member between the column and the tubular member and at least one properly seated gasket member when the column cannot be suitably positioned axially relative to the tubular member in order to properly seat at least one gasket member during assembly of hardware utilized to seat at least one gasket member. The system preferably includes a first gauge for testing whether the column can be suitably positioned axially so that at least one gasket member is properly seated during assembly of hardware used to seat the gasket member. The system preferably also includes a second gauge used in conjunction with the first gauge when the column cannot be suitably positioned.

5 Claims, 17 Drawing Sheets

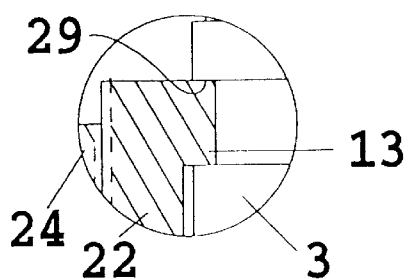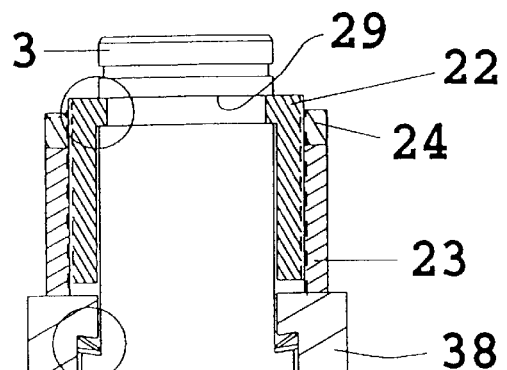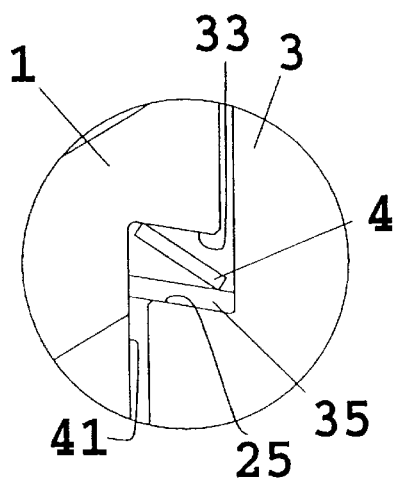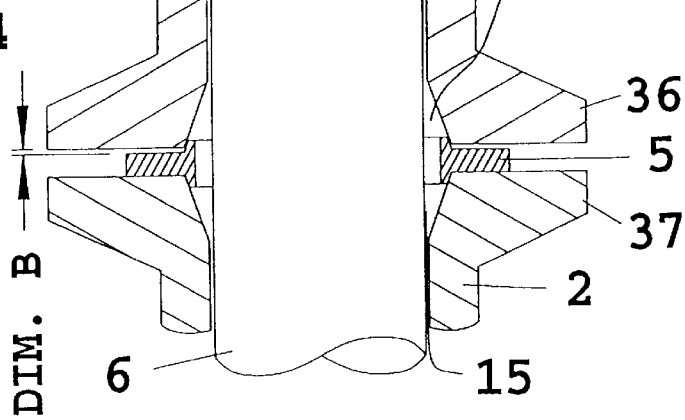
FIG. 18
FIG. 17
FIG. 16

SYSTEM FOR SEATING AT LEAST ONE GASKET IN A PRESSURE VESSEL PENETRATION WHERE A COLUMN PENETRATES TELESCOPICALLY

BACKGROUND OF THE INVENTION

1. Field of the Invention

The present invention relates generally to a system adapted to seat at least one gasket used to seal interfaces between a column and a tubular member where the column penetrates through the tubular member and an opening or port in a pressure vessel and more particularly to a structural system which can be used to properly seat at least one gasket located at interfaces between a thermocouple column and a tubular member in an instrument port of a pressurized water reactor vessel head.

2. General Background

It has been required that water temperatures at certain discrete locations be continuously reported to reactor operators during plant operation in commercial nuclear power plants designed in the United States. In some pressurized water reactors where thermocouples measure water temperatures inside the reactor vessels, these thermocouples are routed into thermocouple columns, pass through the reactor vessel head, and are connected to the power plant control room so that these temperatures are available to reactor operators. The openings where these thermocouples pass through the reactor vessel head are sealed using gaskets and instrument port hardware.

Seal reliability of the primary pressure boundary in commercial nuclear power plants is important because of the high potential for damage to the reactor vessel and/or head if a leak should occur. In addition, personnel receive radiation exposure while repairing a leak and utility companies must purchase expensive replacement power during plant shutdown for leak repair.

Because of the design and configuration of instrument port hardware and the reactor vessel head, trained radiation workers normally disassemble the instrument port hardware prior to refueling and reassemble this same hardware after refueling has been completed. Since this work must normally be performed on the critical path in a high radiation area during refueling and the plant cannot operate with a reactor vessel head leak, this hardware must be assembled quickly and reliably in order to minimize plant downtime and radiation exposure to the workers. This work is difficult to accomplish because of the small work space available, the lack of a stable platform to stand on, the physically restrictive clothing required to protect radiation workers from radioactive airborne contamination, and the very high temperatures and noise levels sometimes encountered.

The term "instrument port hardware" as used herein is intended to refer to the hardware used to seal interfaces between the conduit seal 3 and the lower member or flange attached to the reactor vessel head standpipe 32. The lower flange is not removable using ordinary hand tools.

Evidence of this problem has been available for many years. The problem is usually denoted by a leak during plant shutdown from the upper gasket which is located between the conduit seal and the upper flange. When this occurs, a white buildup of boric acid can be seen in the instrument port after plant shutdown. Because of this white color, it is known that the leak is fresh and did not occur while the plant was running since fresh white boric acid soon turns an orange-brown-black color in the environment above the reactor vessel head during plant operation.

In one plant, which started operation well over twenty years ago, one upper joint leaked every time the plant was shut down and pressure inside the reactor vessel was reduced to atmospheric pressure. Finally, after many repeat occurrences, examination of the inside of the relevant reactor vessel head standpipe revealed the presence of discrepant weld buildup from the weld attaching the reactor vessel head standpipe to the reactor vessel head. The problem stopped occurring at that location after this excessive weld buildup was removed but that same utility has had another leak from a different upper joint during plant shutdown after a later fuel cycle.

In a different plant, one upper joint in an instrument port leaked very slightly at low pressure during plant start-up after refueling. The plant was shut down and the instrument port hardware at three thermocouple column locations was disassembled and reassembled properly with new gaskets. No leaks were observed during the subsequent plant start-up or operation, however, during a later fuel cycle an upper joint leaked during plant shutdown.

In another plant, very slight weeping (one drop every 5–10 minutes) was observed from the upper joint at one thermocouple column location while primary pressure was very low. To seal the joint, pressure inside the reactor vessel was reduced to atmospheric pressure and the instrument port hardware was removed and reassembled properly using new gaskets. When the plant was pressurized again, this same weeping resumed at very low pressure but stopped when pressure inside the reactor vessel was increased and the joint continued to seal while the plant operated. Leakage did, however, resume later when the pressure inside the reactor vessel was reduced to atmospheric pressure after plant shutdown.

A more serious problem occurred at a plant where the upper joint leaked continuously when the reactor vessel was pressurized and continued to leak while the plant operated until the plant was shut down and the leak was repaired. This same upper joint leaked during the following fuel cycle until the plant was shut down to repair the leak. In both instances, the instrument port hardware was disassembled and then reassembled with new gaskets. During the next refueling period, the column was straightened and consequently, the problem did not reoccur at that location.

Leakage at many other plants has occurred during plant shutdown. Any leakage causes a very real concern because of the potential for boric acid damage to the reactor vessel and/or reactor vessel head since the outside of these structures, unlike the inside, is not protected from boric acid damage. Damage occurred at one plant when a leak unrelated to instrument ports caused over one inch to be removed from the exterior of the reactor vessel head by boric acid attack in a very short time.

The stuck column problem is caused by the intrinsic design of the thermocouple column. The column is made of a steel having a coefficient of thermal expansion which is significantly greater than the coefficient of thermal expansion of the steel used to make the reactor vessel, reactor vessel head, and reactor vessel head standpipe. Because of this "alpha mismatch" and the very long lengths involved, adequate provision was made by designers for the column to elongate and contract during reactor vessel heat-up and cool-down and consequently, if the column moves freely in the axial direction it is fixed at the location of the upper gasket when the instrument port hardware is assembled. When prior art is used, the upper gasket is properly seated, which means that it has been properly preloaded axially, when the thermocouple column is appropriately pulled up during assembly of the instrument port hardware.

Any thermocouple column can be prevented from moving axially during assembly of the instrument port hardware by a discrepant axial friction load applied at the interfaces between the column 6 and standpipe 32 and/or at the bottom of the column 6 where it interfaces with the upper support 27; FIG. 1 shows these interfaces. A discrepant axial friction load can be caused by a thermocouple column which is bent or cocked inside the reactor vessel head penetration or at the bottom of the column or at any obstruction that occurs at either location. When the column is constrained from moving axially, hardware assembly forces intended to pull the column up and seat the upper gasket are instead expended to offset these friction forces and if these friction loads exceed hardware assembly forces, the upper gasket will not be seated then and a leak results.

The instrument port hardware used in relation to the above anecdotal evidence is shown in FIGS. 3 and 5. When this hardware is assembled or if the hardware shown in FIG. 6 is utilized and the upper gasket 4 is not properly seated, the pressure blow-off load may overcome the discrepant friction load and force the column upward and seat the upper gasket while the plant is operating, but if this occurs, the hardware intended to seat the upper gasket (i.e., jack screws or upper articulated clamp) becomes loose and consequently, during plant shutdown when pressure is reduced, the pressure blow-off load is removed and the column drops due to its own weight—especially if any vibration occurs. This downward motion of the column causes the upper gasket to become unseated and potentially scored which in turn causes a leak when pressure in the reactor vessel is reduced (viz: during plant shutdown).

A problem can also result if the hardware shown in FIG. 4 is used to seat the upper gaskets 4. If the column is stuck and the hardware will assemble so that the upper gaskets are not properly seated during hardware assembly, the pressure blow-off load may overcome the discrepant axial friction load and force the column up at any time during plant operation. Unfortunately, this upward motion will always unseat the upper gaskets and cause a leak when the upward motion occurs and there are only two ways to seal the upper joint: pull the reactor vessel head and eliminate the root cause of the problem before further plant operation or utilize the present invention.

When the reactor vessel 28 is pressurized during plant operation, the upward pressure blow-off load has the same order of magnitude as the forces generated during assembly of the instrument port hardware intended to seat the upper gasket(s) 4. If this hardware does not seat the upper gasket(s) when it is assembled and the pressure blow-off load is not large enough to overcome the discrepant axial friction load, the upper joint will leak until plant shutdown. If repetitive assembly of the instrument port hardware, as was done before, does not cause the upper gasket to be properly seated, the only way to seal the upper joint except as defined by the present invention, is to remove the reactor vessel head, diagnose the root cause of the problem, and eliminate the cause of the problem before further plant operation.

A worst case scenario when the hardware shown in FIGS. 3 through 6 is used would be for a leaking upper joint to cause a steam cut of the upper member and/or conduit seal with the result that the leak rate would increase.

Where interfaces between two bodies are sealed by gaskets, application of the proper axial preload to and proper seating of the gasket(s) is a necessary condition for any gasket of any design to seal. With prior art, these requisite seating forces can only be applied as a result of movement of the conduit seal/thermocouple column relative to the upper member 1.

In all prior art, when instrument port hardware assembly is started, the tubular member 1 or 12 immediately above the lower member 2 is first forced downward to properly preload and seat the lower gasket 5. When the appropriate clamping and securing means is assembled to maintain proper axial preload on the lower gasket 5, the upper member 1 shown in FIGS. 3 through 5 or Lhuillier's intermediate member 12 shown in FIG. 6, can be considered to be fixed relative to the lower member 2, the reactor vessel head standpipe 32, and the reactor vessel head 26. If the thermocouple column/conduit seal is also discrepantly fixed relative to the reactor vessel head standpipe 32 and upper support 27 by the existence of a sufficiently large friction load applied to the thermocouple column then appropriate motion of the column 6 relative to the upper member 1 necessary to seat the upper gasket 4 cannot occur and consequently, the upper gasket 4 leaks when the reactor vessel is pressurized unless the pressure blow-off load just happens to seat the upper gasket.

The upper member is always fixed relative to the reactor vessel head when the lower clamping and securing means is assembled. When the thermocouple column 6 is free to move axially relative to the upper member 1, the upper gasket 4 is seated in the same way that gaskets in other closures are seated: at least one of the bodies (the column) is caused to move relative to the other body (the upper member) so that the gasket at their common interface is seated. Conversely, when the thermocouple column 6 is discrepantly fixed, the upper joint between a conduit seal and the upper member in an instrument port is distinctly different from other joints sealed by gaskets in at lease one respect: neither of these bodies can be axially moved relative to the other body so as to cause the gasket(s) 4 at their interfaces to be seated unless the column 6 happens to be stuck at the one elevation where the gasket(s) 4 will be seated at the same time the lower gasket 5 is seated when the lower clamping and securing means is assembled.

An early hardware configuration is illustrated in FIG. 3. As is typical of all prior art, the lower member 2 is permanently attached to the top of the reactor vessel head standpipe 32 (illustrated in FIG. 1). Special hydraulic axial loading devices are needed to seat the lower gasket 5 located at the interfaces between the upper member 1 and lower member 2. After the lower gasket is seated, a lower clamp (not shown) is installed which maintains the requisite axial preload on the lower gasket 5 during plant operation. It is intended that torquing the jack screws 7 will pull the conduit seal 3 and thermocouple column 6 up and seat the upper gasket 4 by applying a downward force to the upper member 1 and a corresponding upward force to the jack screw plate 9, split ring 8, and loading ledge 29 on the conduit seal 3. Assembly of this hardware is time consuming due to the required use of specialized, bulky, and heavy hydraulic loading devices which sometimes interfere with adjacent structures on the reactor vessel head 26, the necessary repetitive torquing of the jack screws 7, and the requirement to assemble the lock wire used with the jack screws.

Other hardware that can be used to seal the instrument port is shown in FIG. 4 and is disclosed in U.S. Pat. No. 4,655,483 issued to Margotta. This hardware was designed to replace the original hardware shown in FIG. 3. Since the lower gasket design shown in FIG. 3 was changed by Margotta, the upper member 1 and the lower member 2 were changed accordingly in the region of the lower gasket 5. The upper gaskets 4 are seated in theory by torquing the actuator drive nut 19 which forces the actuator drive sleeve 18 down into the annular space between the conduit seal 3 and the upper member 1. When the actuator drive nut 18 is torqued, it applies an upward force to the annular thrust bearing 20 which in turn causes the split ring collar 21 to apply an upward force to the loading ledge 29 of the conduit seal 3. It was intended that the thermocouple column 6 will always be pulled up during hardware assembly so that the gap, labeled as DIM. A in FIG. 4, is zero after completion of this torquing operation.

In a later version of the hardware shown in FIG. 4, the upper member inner ear or flange which is shown bounded below by the conical surface 33 and bounded above by the upper gaskets 4 was eliminated from the design and either of the lower gaskets shown in FIG. 3 or 4 was used. In this same later version, the upper hardware (the actuator drive sleeve 18, actuator drive nut 19, annular thrust bearing 20, and split ring collar 21) must be disassembled before the reactor vessel head 26 is removed during refueling but the lower hardware (lower clamp, lower gasket 5, and upper member 1) is not normally removed during refueling and the upper gaskets 4 in theory directly interface with the conical surface 25 of the conventional conduit seal 3. The lower hardware used in this later version is shown in FIG. 22 unless the lower gasket 5 shown in FIG. 3 is used and in that event, the upper and lower members 1 and 2 shown in FIG. 22 are appropriately modified to the configuration shown in FIG. 3 at their interfaces with the lower gasket 5.

One variation of the prior art shown in FIGS. 3 and 4 which was placed in service mostly in some European plants utilized the upper hardware (jack screws 7, jack screw plate 9, and split ring 8) and the same style upper gasket 4 shown in FIG. 3 and the lower gasket 5 shown in FIG. 4 and the upper and lower members 1 and 2 were changed accordingly to properly interface with this lower gasket. The advantage to this variation relative to the hardware shown in FIG. 3 is that no special hydraulic axial loading devices are needed to seat the lower gasket 5 since the lower clamp used with this variation performs this function.

Additional hardware is disclosed in U.S. Pat. No. 4,812, 285 issued to Stapleton. This hardware, shown in FIG. 5, was also designed and configured to replace the hardware illustrated in FIG. 3. Stapleton eliminated the use of the lower clamp and heavy hydraulic loading devices by developing a lower articulated clamp (not shown) which seats the lower gasket 5 when it is torqued and then maintains requisite lower gasket preload during plant operation. The jack screws 7, jack screw plate 9, split ring 8, and jack screw lock wire used in the design shown in FIG. 3 were replaced by an upper articulated clamp 10 and upper positioner 11. It was intended that torquing of the upper clamp 10 would always cause the conduit seal 3 and thermocouple column 6 to be pulled up thus seating the upper gasket 4.

Another hardware configuration is disclosed in U.S. Pat. No. 5,084,228 issued to Lhuillier and also illustrated in FIG. 6. This design was developed to replace the hardware defined above as a variation of the prior art shown in FIGS. 3 and 4. Lhuillier disclosed hardware having a lower flange 2, an intermediate flange 12, and an upper flange 1. Lhuillier used a two-piece lower clamp similar to that used by Margotta for seating lower gasket 5 and maintaining axial preload during plant operation. The interface between the intermediate flange 12 and the lower flange 2 is sealed by an intermediate gasket 14 which is seated by torquing the cap screws 16 into the annular mounting pieces 17. It was again intended that torquing the jack screws 7 would always pull the thermocouple column up so that the upper gasket is seated. This operation is similar to torquing the jack screws of the hardware shown in FIG. 3.

An implicit and intrinsic premise of each of the designers of prior art is that the thermocouple column will always be free to move up during hardware assembly so that the upper gasket(s) can be properly seated. Unfortunately, this is not always true.

If proper seating of the upper gasket(s) has not occurred before the reactor vessel is pressurized, the gasket(s) may not be axially preloaded and consequently may be "floating" during plant operation unless application of the pressure blow-off load, which is an upward force applied to the thermocouple column when the primary system is pressurized during plant operation, causes the thermocouple column to move upward sufficiently and cause the requisite axial preload to be applied to the upper gasket then; unfortunately, this cannot occur when the hardware defined in FIG. 4 is utilized. Clearly, if the pressure blow-off load causes upward movement of the thermocouple column, this can cause the upper gasket to seal or leak depending on the design of the instrument port hardware. In all instances, however, failure to properly seat the upper gasket(s) during hardware assembly may cause a leak since a necessary condition for any gasket to seal, regardless of its design, is that it must be properly preloaded axially and seated.

Heretofore, there has been no way for radiation workers to know that a thermocouple column was stuck or, if stuck, to take proper corrective action to assure proper seating of the upper gasket(s) during hardware assembly. Furthermore, after a leak from the upper joint has occurred and the plant has been shut down and plant pressure has been reduced, it has been extremely difficult to verify that the upper gasket(s) 4 were not properly seated during hardware assembly because the action of the pressure blow-off load tends to force the thermocouple column upward when the reactor vessel is pressurized—thus seating or unseating these gasket (s) depending on the hardware used.

Prior art relevant to the stuck column problem is limited to finding the reason why the column is stuck after a leak has occurred and the plant is shut down and then eliminating that root cause so that the column moves freely in the axial direction during assembly of the instrument port hardware.

SUMMARY OF THE PRESENT INVENTION

FIG. 1 illustrates a partial cross sectional view of the upper head region of the pressurized water reactor vessel head where an instrument port is located. The head is shown installed on the reactor vessel 28. The instrument port is that region of the reactor vessel head 26 where the thermocouple column 6 which is attached to the conduit seal 3 passes through the vessel head standpipe 32. Thermocouple conduits 34 are shown extending upward from upper support 27 into the thermocouple column 6 and out the top of the conduit seal 3 and consequently, they pass through the primary pressure boundary of the reactor vessel head 26 at the instrument port. Each such nuclear plant has multiple instrument ports.

The conventional conduit seal is shown attached to the top of the thermocouple column 6 in FIG. 1 and is illustrated in further detail in FIG. 2. (The diameter "c", designated c Ø, will be used later under the section: Detailed Description of the Preferred Embodiment and is shown again in FIG. 13). Upward forces generated during assembly of the instrument port hardware are applied to ledge 29 located on the under-side of the large circumferential groove around the outer diameter near the top of the conduit seal 3. In all prior art, these upward assembly forces must generally lift the conduit seal 3 and thermocouple column 6 in order to seat at least one upper gasket which is located above conical surface 25. Necessary and sufficient conditions for an upper gasket to seal are: 1) the gasket must be properly designed, 2) good mechanical practices must be used when the gasket and instrument port hardware is assembled, and 3) the requisite preload must be applied to the gasket(s) to assure that proper seating occurs and this last condition occurs normally only if the conduit seal/thermocouple columns are pulled up appropriately during instrument port hardware assembly.

The present invention defines a system for proper seating of gasket(s) used to seal interfaces between a tubular body and a column which penetrates through the tubular body and a port in a pressure vessel. In conventional hardware configurations, the column is a thermocouple column/conduit seal that penetrates through an instrument port in a reactor vessel head in a commercial nuclear power plant and the tubular body is an upper member which is mounted on a lower member and both members have a flanged and an unflanged end and are secured to each other via a conventional clamping and securing means installed around their interfacing flanged ends. A lower gasket is located between these flanged ends and it is seated once an axial loading device or clamping and securing means is properly attached. The upper member is adapted to permit the top part of a conventional conduit seal to pass axially through its center and at least one upper gasket is used to seal interfaces between the upper member and conduit seal.

As will be seen, the invention increases the sealing reliability of conventioned hardware since the leak mechanisms caused by a discrepantly stuck column are eliminated. Stuck thermocouple columns have caused the upper gasket to be improperly seated since the thermocouple column could not be appropriately pulled up during assembly of instrument port hardware to seat the upper gasket and consequently leaks from the upper joint have occurred.

The first embodiment of the present invention functions like a go/no-go gauge to enable workers to diagnose the stuck column problem when it occurs. This embodiment comprises a non-tubular gauge means adapted to be temporarily installed on the lower member or the lower gasket depending on which hardware is used to seal the instrument port while the conduit seal penetrates therethrough and prior to assembling the upper member. When it is in place, each non-tubular gauge means has a distinctive flat surface that is located so that if the top edge of the conical surface on the conventional conduit seal can be pulled up until it touches this distinctive flat surface, the upper gasket(s) would have been properly seated if an appropriate upper member had instead been installed on the lower member and a lower gasket had been seated properly and consequently, workers can remove the non-tubular gauge means and assemble the instrument port hardware using normal procedures without concern for a stuck column.

Conversely, when the thermocouple column cannot be pulled up as just discussed, the column is stuck and after the axial discrepancy in conduit seal location is measured, the second embodiment of the present invention, a planar gauge means, is used to measure the as-built length of the non-tubular gauge means and upper member to be used at the location of the thermocouple column that is stuck or comparatively measure the length of these members. These and other measurements are used to determine the necessary thickness of spacer means to be placed in series with the upper gasket(s) in order to assure proper seating of the upper gasket(s) during hardware assembly since the column is stuck.

Alternately, when the instrument port hardware is a later variation of the hardware shown in FIG. 4 where the lower hardware (upper member 1, lower gasket 5, and lower clamp) is not removed before pulling the reactor vessel head during refueling, the first and second embodiments of the present invention are combined into a single gauge means which functions directly as a go/no-go gauge and can be used with the unflanged end 38 of the upper member 1 to make a single measurement (DIM. C in FIG. 22) which can be used as a basis for determining the requisite thickness of spacer means to be placed on the conical surface 25 of the conventional conduit seal 3 in series with the two upper gaskets so that both gaskets will be seated when the upper hardware (actuator drive sleeve 18, actuator drive nut 19, annular thrust bearing 20, and split ring collar 21) is assembled.

In a third embodiment of the present invention, necessary spacer means such as, spacers, other gaskets, washers, shims or the like are placed on the conical surface around the outer diameter of the conventional conduit seal in series with the upper gasket(s) so that the upper gasket(s) will be properly seated and no inappropriate axial gaps exist after the instrument port hardware is properly assembled.

A fourth embodiment of the present invention is adapted for quick assembly above a conventional upper member in order to seat the upper gasket and, unlike some prior art, to accommodate utilization of any necessary spacer means when the thermocouple column has been found to be stuck. The fourth embodiment will permit use of any necessary spacer means without any modification and may be used to replace upper hardware in the designs shown in FIGS. 3, 5, and 6 after a conventional upper member has been appropriately modified.

Accordingly, it is an object of the present invention to increase seal reliability of all instrument port hardware designs using a conventional conduit seal/thermocouple column and a tubular upper body by appropriate use of the spacer means in the present invention to eliminate the root cause of many of the previous upper joint leaks.

It is another object of the present invention to accommodate any necessary number of spacer means without modification.

Still a further object of the present invention is to provide a system which will minimize the amount of time workers are exposed to the hazardous working environment and to minimize the number of workers so exposed.

It is yet another object of the present invention to provide a hardware assembly and method thereof in accordance with the preceding objects which will be of simple construction and easy to use so as to provide an alternative to conventional devices that will be long lasting, reliable, and trouble free.

Although there have been many inventions related to hardware apparatuses, none of the inventions developed heretofore have enabled the workers to take proper action to assure that the upper gasket(s) are properly seated during hardware assembly. Additionally, the present invention meets the requirements of simplified design, compact size, and ease of installation in order to successfully employ the invention.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims in conjunction with the accompanying drawings.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 16 is a cross-sectional view of the fourth embodiment of the present invention with a conventional upper and lower member and illustrates a spacer means installed beneath an unseated upper gasket;

FIG. 17 is an exploded view of the interface between the conical surfaces of the conduit seal and upper body member as illustrated in FIG. 16;

FIG. 18 is an exploded view of the upper corner portion of the retainer means used in the fourth embodiment of the present invention secured to a conventional conduit seal as illustrated in FIG. 16;

Similar reference numerals refer to similar parts throughout the several views of the drawings.

DETAILED DESCRIPTION OF THE PREFERRED EMBODIMENT

Experience in numerous containment buildings has proved that discrepantly constrained thermocouple columns have caused leaks to occur because the upper gaskets were not properly seated. Although the problem appears to occur with increasing frequency in older plants, it is very insidious because a new plant may operate through many fuel cycles before the problem occurs the first time, however, at least one new plant has had to shut down because of a leak caused by a stuck thermocouple column.

The first embodiment of the present invention is a non-tubular gauge means 30 which is used to diagnose the problem before assembly of instrument port hardware. It functions as a go/no-go gauge since it enables workers to determine whether or not a particular thermocouple column is stuck by checking to see if it can be easily lifted to an elevation where at least one upper gasket will be properly seated when the instrument port hardware is assembled.

Figure 3:
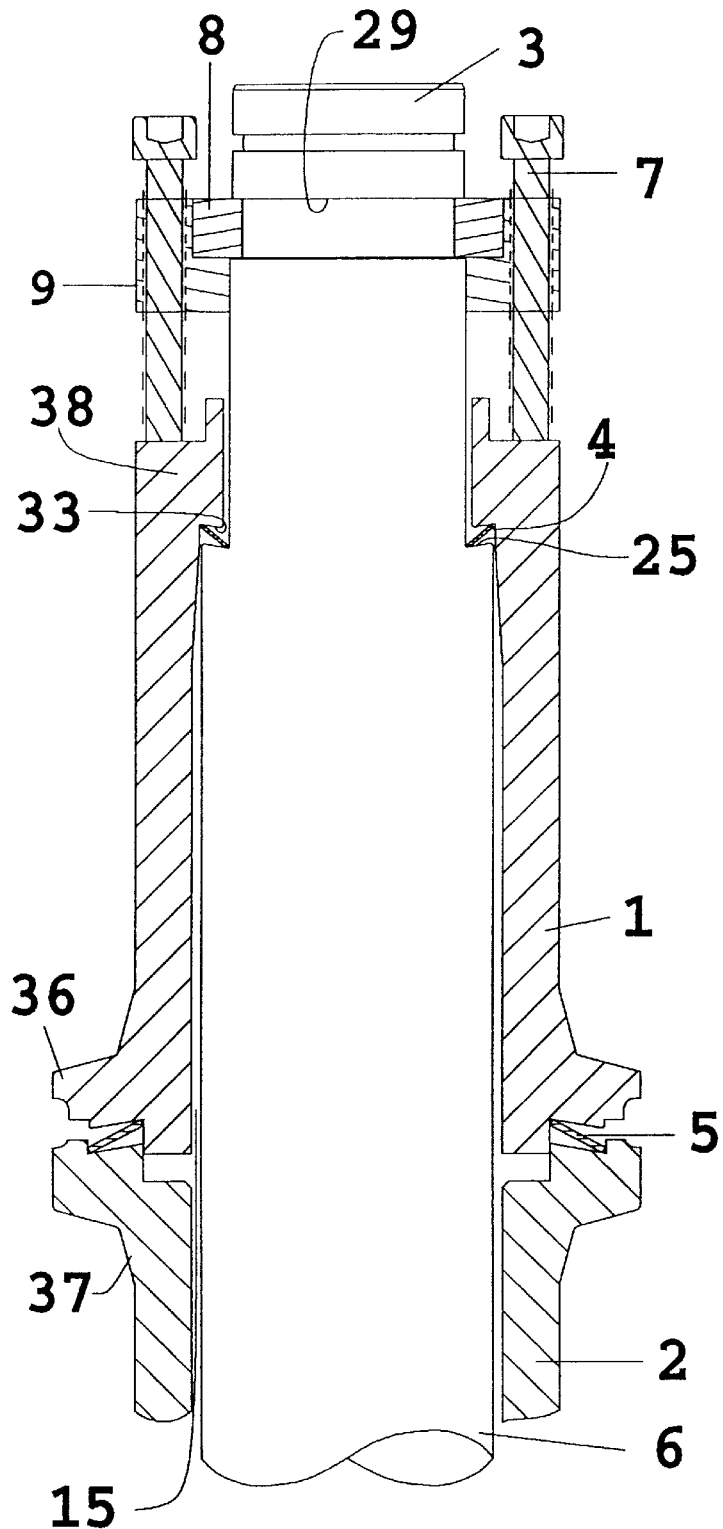
FIG. 3 is a cross-sectional view of a first embodiment of conventional instrument port hardware.
Figure 7:
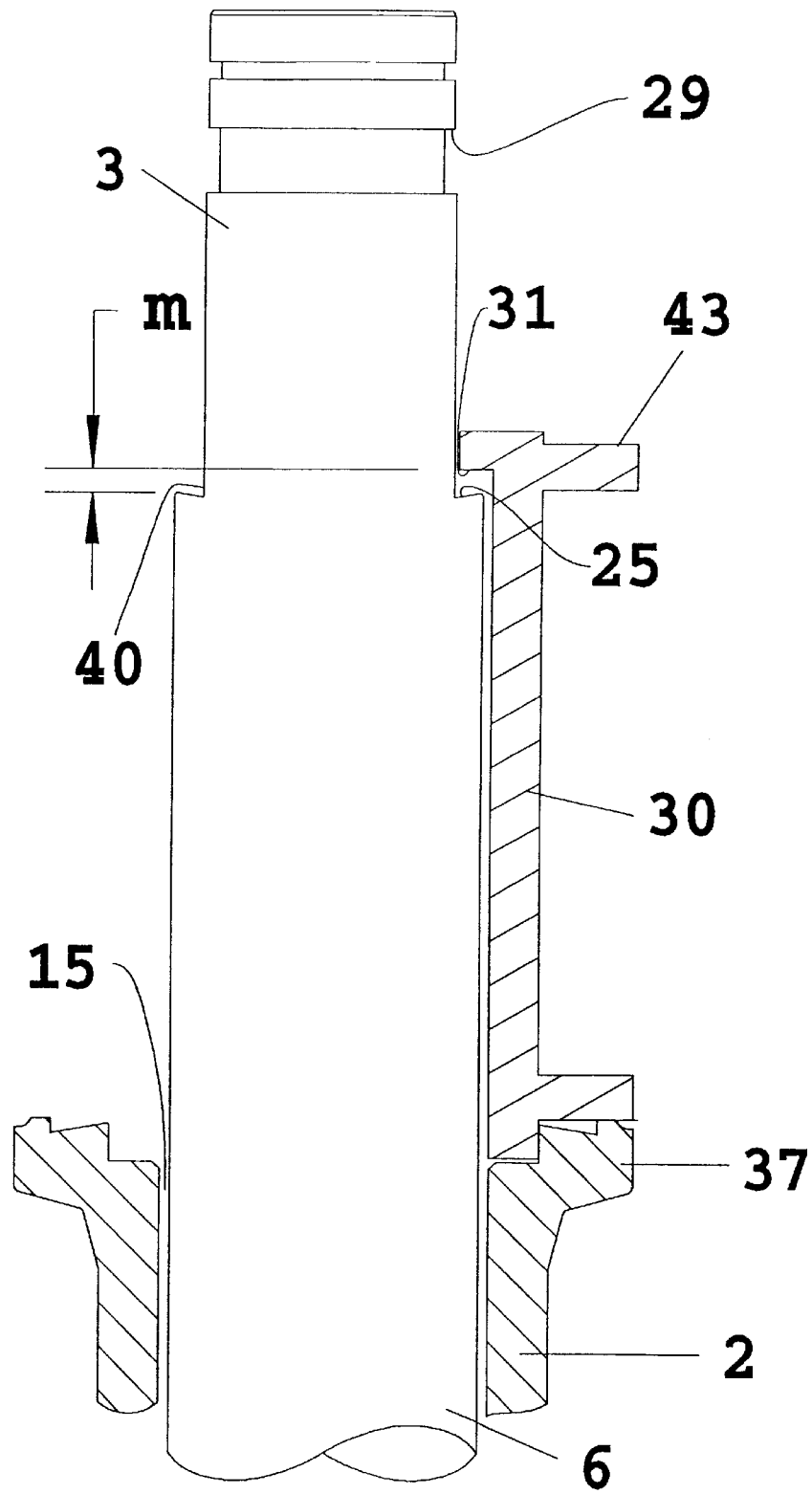
FIG. 7 is a cross-sectional view of the first embodiment of the present invention or non-tubular gauge means temporarily in place on a conventional lower body member with the thermocouple column/conduit seal passing through the lower body member.
Figure 8:
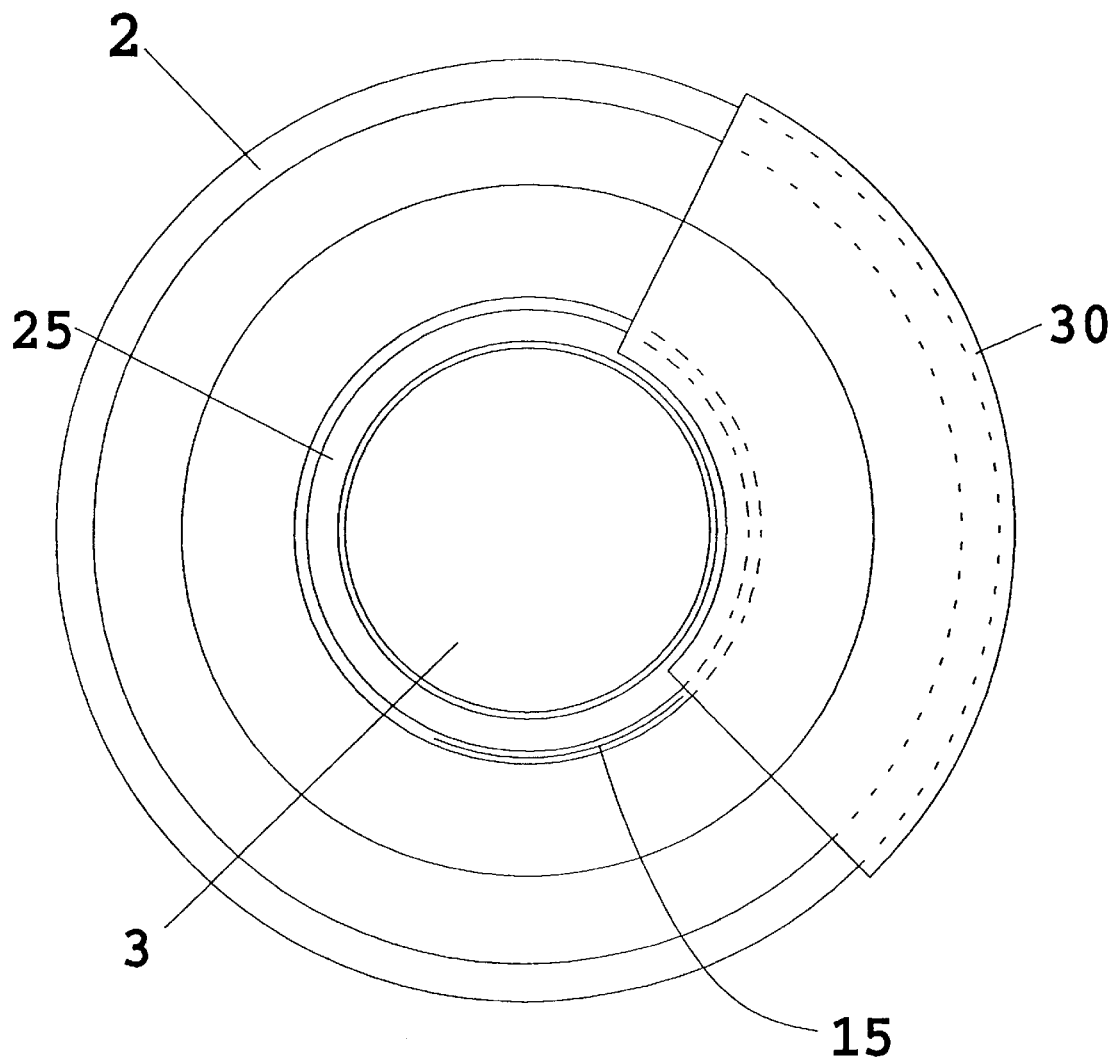
FIG. 8 is a plan view of a conventional lower body member and conduit seal with the first embodiment of the present invention attached as illustrated in FIG. 7.

An example of this gauge means 30 (which may be used with any instrument port hardware using the lower gasket 5 shown in FIG. 3 where the upper member 1 is removed during refueling before the reactor vessel head 26 is pulled) is shown in further detail in FIGS. 7 and 8. Alternately, if the instrument port hardware uses the lower gasket shown in FIG. 4 and the upper member 1 is removed during refueling before the reactor vessel head 26 is pulled, the non-tubular gauge means 30 shown in FIGS. 7 and 8 is modified at the bottom so that it interfaces with the flat surface near the outer diameter of a lower gasket 5 assembled on the lower member 2. Each particular gauge means 30 is designed so that when it is correctly mounted on the flanged end 37 of the lower member 2 as shown for example in FIGS. 7 and 8, or on the assembled lower gasket 5, surface 31 of the gauge means 30 is very slightly above conical surface 33 of the appropriate upper body member 1 when it is similarly mounted on the lower body member 2 or lower gasket 5. Since the non-tubular gauge means subtends an angle of less than 360° unlike the upper member, a worker can see if the top edge of the conical surface 25 on the conduit seal 3 contacts surface 31 of the gauge means 30 while the column is being lifted.

Figure 4:
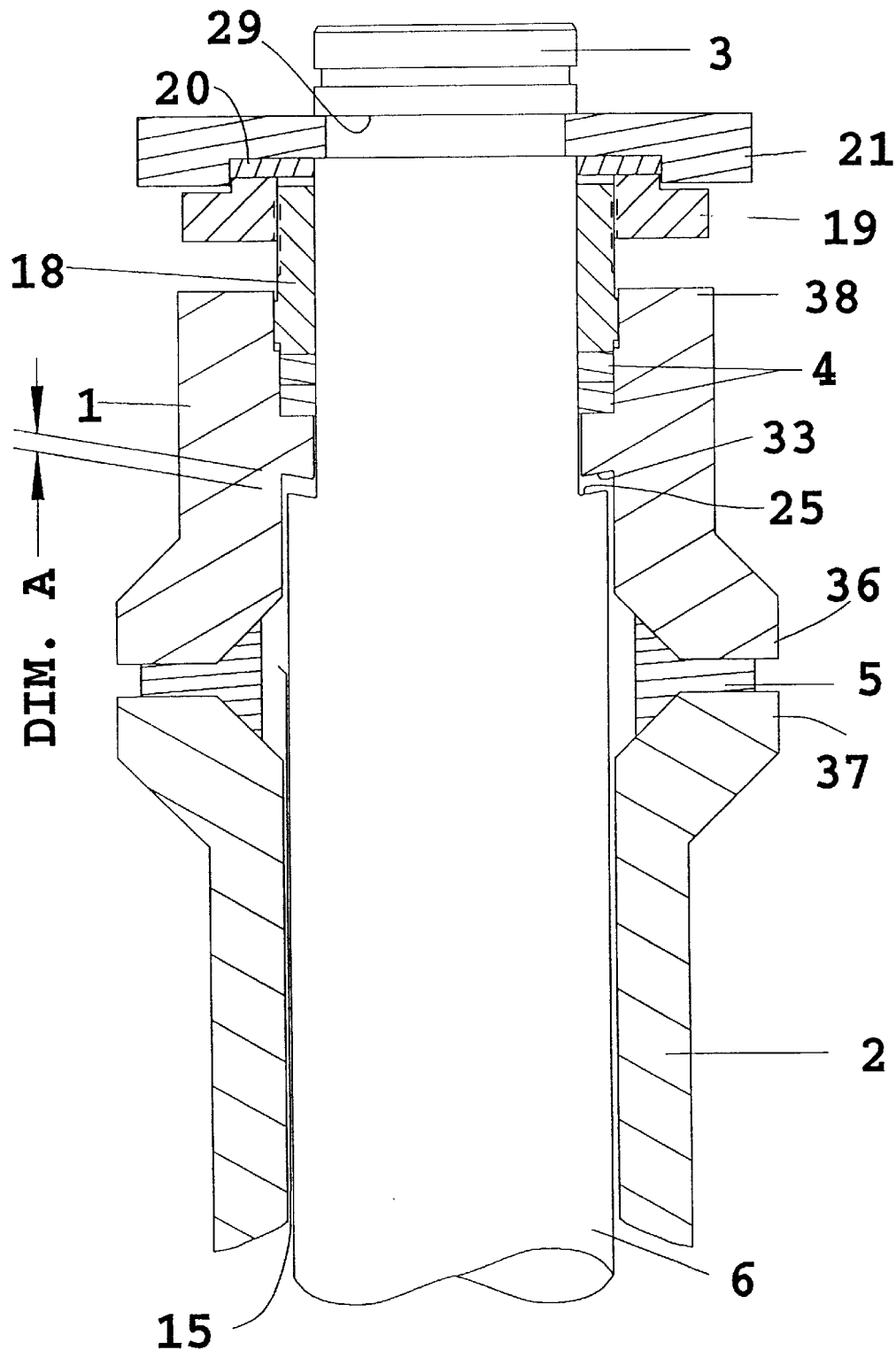
FIG. 4 is a cross-sectional view of a second embodiment of conventional instrument port hardware.

Accordingly, to utilize the gauge means 30, the radiation worker places it on the flanged end 37 of the lower body member 2 as shown for example in FIG. 7 or the lower gasket 5 unless the later version of the hardware shown in FIG. 4 is used where the lower hardware (lower clamp, upper member, and lower gasket) is not removed during refueling; this later configuration will be discussed later. Once the gauge means is in place, an effort is made to lift the conduit seal 3 and thermocouple column 6. If the thermocouple column 6 can be pulled up easily so that the gap labeled as "m" in FIG. 7 is zero, the column is not stuck and no further special action is required. If this happens, the gauge means 30 is removed and the instrument port hardware can be assembled using the normal procedures to properly seat the upper gasket(s).

Figure 9:
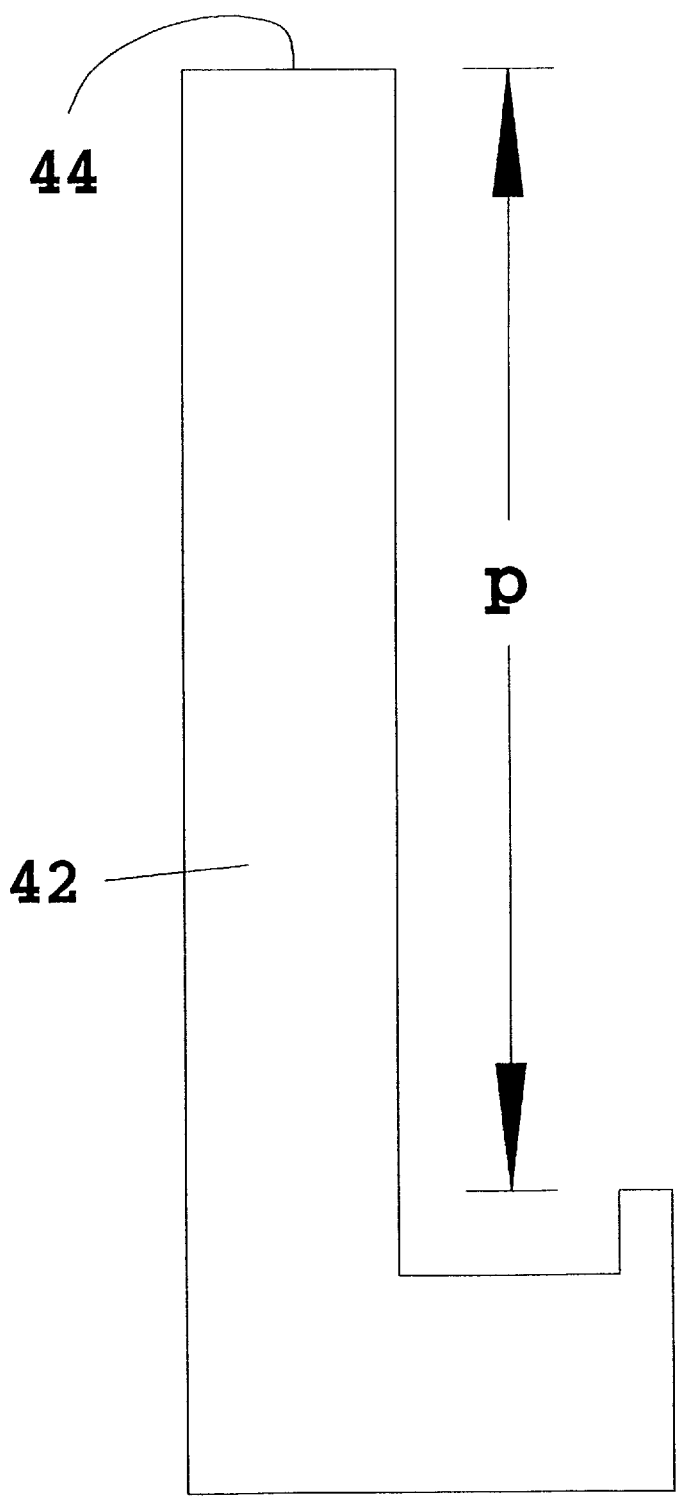
FIG. 9 is a side view of the second embodiment of the present invention which is a planar gauge means.
Figure 10:
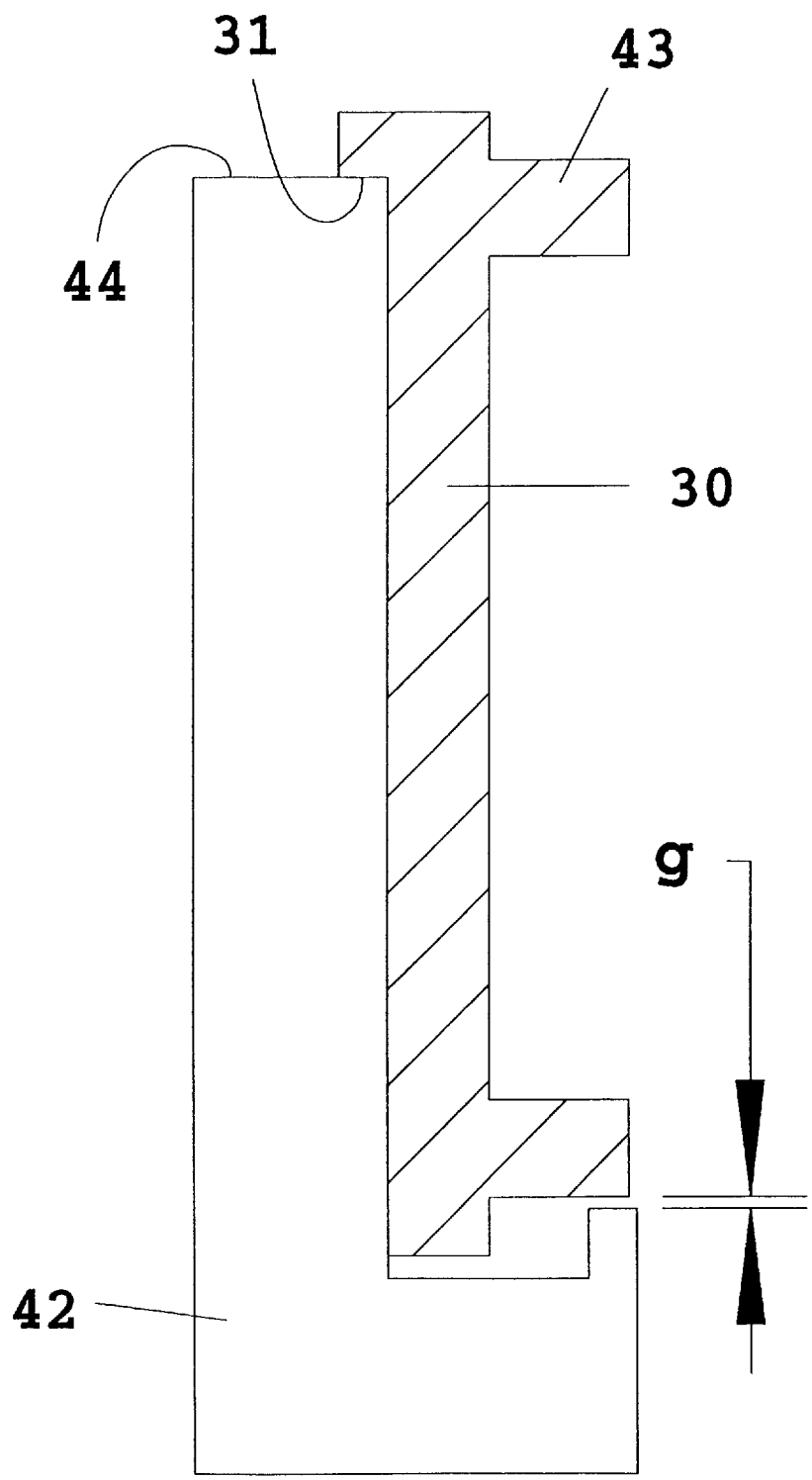
FIG. 10 is a cross-sectional view of the non-tubular gauge means with the planar gauge means attached.
Figure 11:
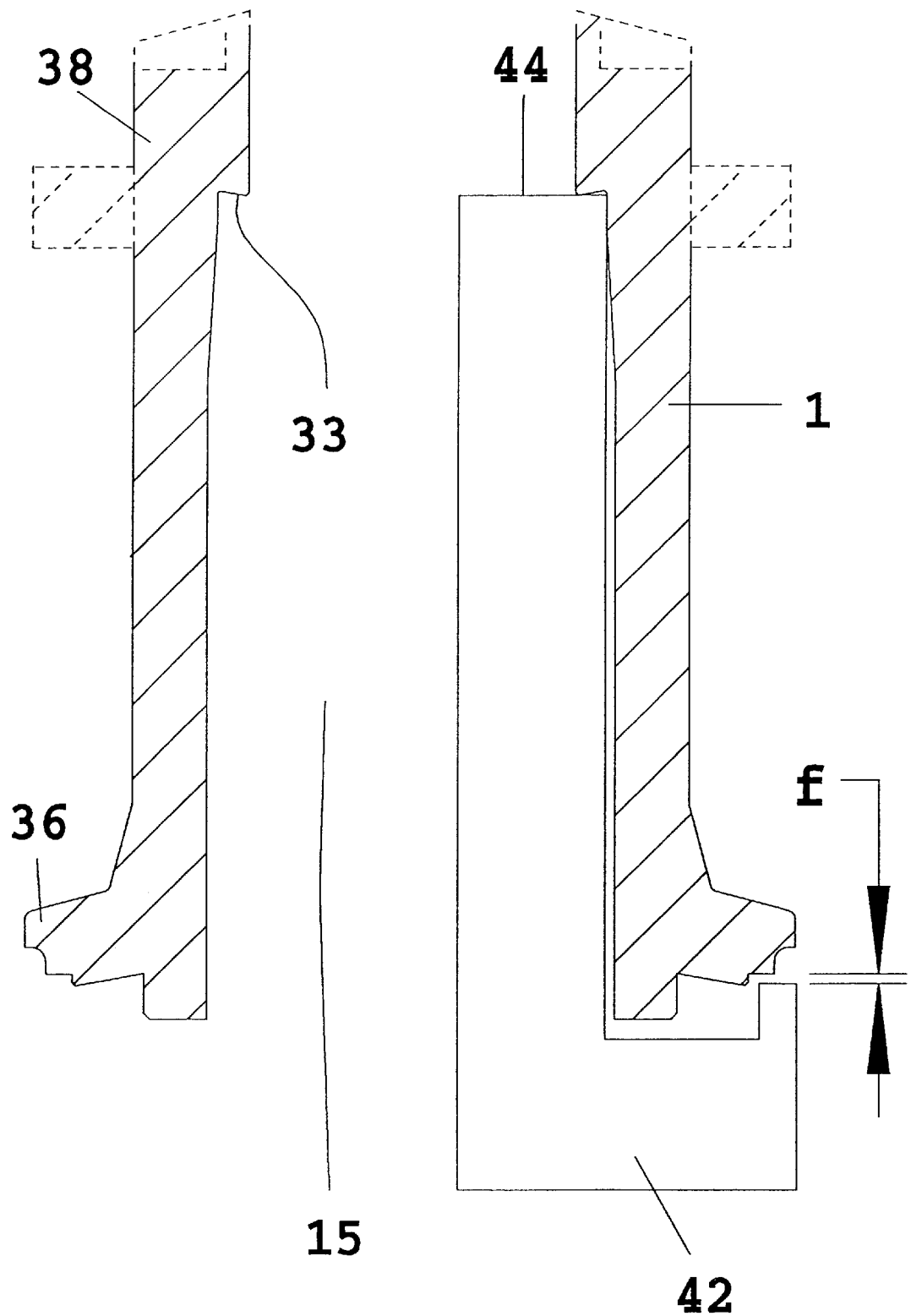
FIG. 11 is a cross-sectional view of a conventional upper member with the planar gauge means assembled inside.

Conversely, if the gap "m" is positive and the thermocouple column cannot be easily pulled up further, the column is discrepantly stuck. Once "m" is measured, the planar gauge means 42 shown in FIG. 9, for use with the hardware shown in FIGS. 3, 5, and 6, which is the second embodiment of the present invention, is used to measure gaps "g" and "f" as shown in FIGS. 10 and 11 or the corresponding as-built lengths of the non-tubular gauge means 30 and the upper member 1 to be used at the instrument port where the thermocouple column is stuck. If the instrument port hardware used is that shown in FIG. 4, the planar gauge means shown in FIG. 9 is adapted to interface with the flat surface at the bottom of the corresponding non-tubular gauge means 30 and the flanged end 36 of the upper member 1.

Figure 1:
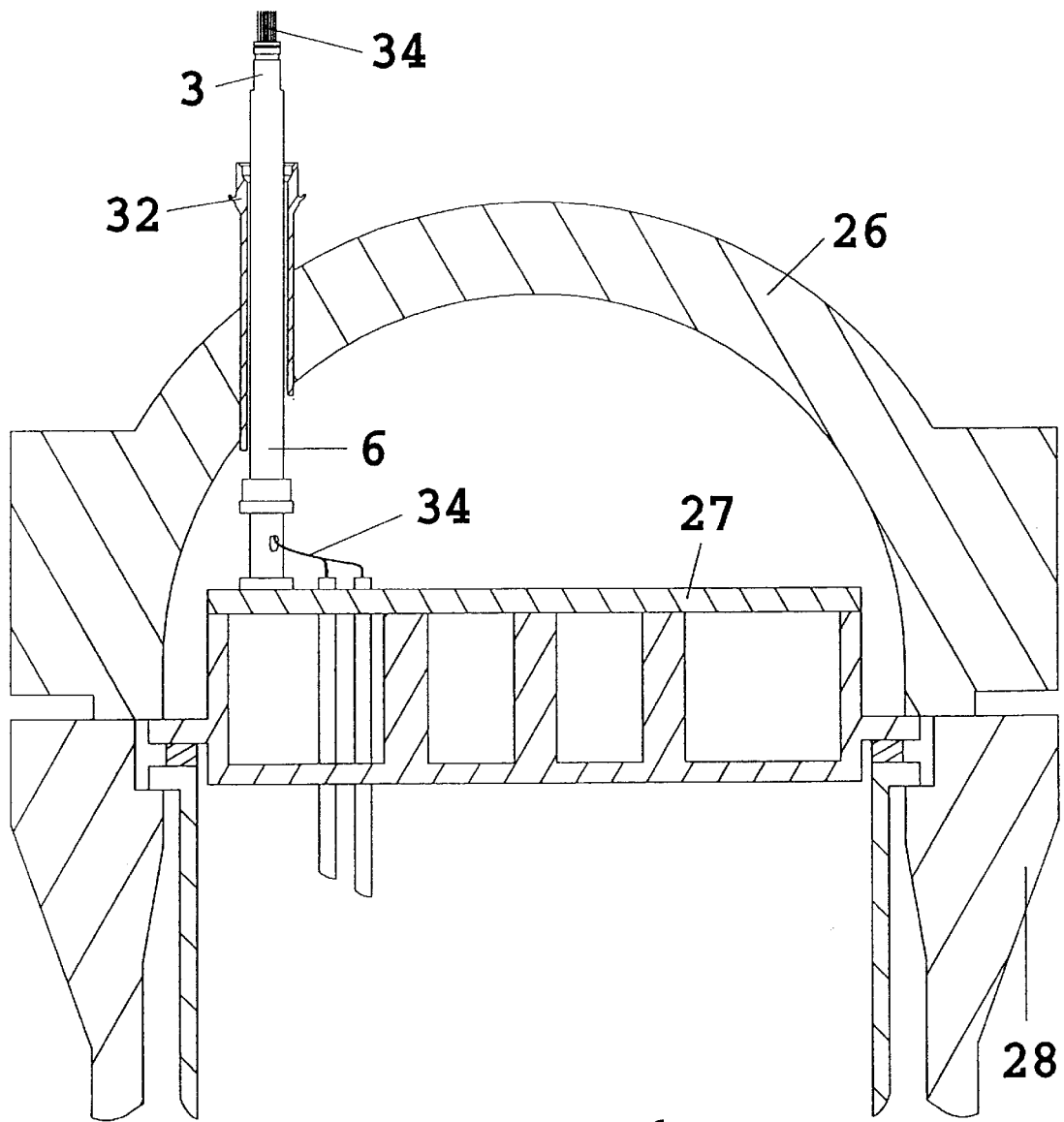
FIG. 1 is a cross-sectional view of the head region of a conventional pressurized water reactor vessel showing one of the instrument ports.
Figure 2:
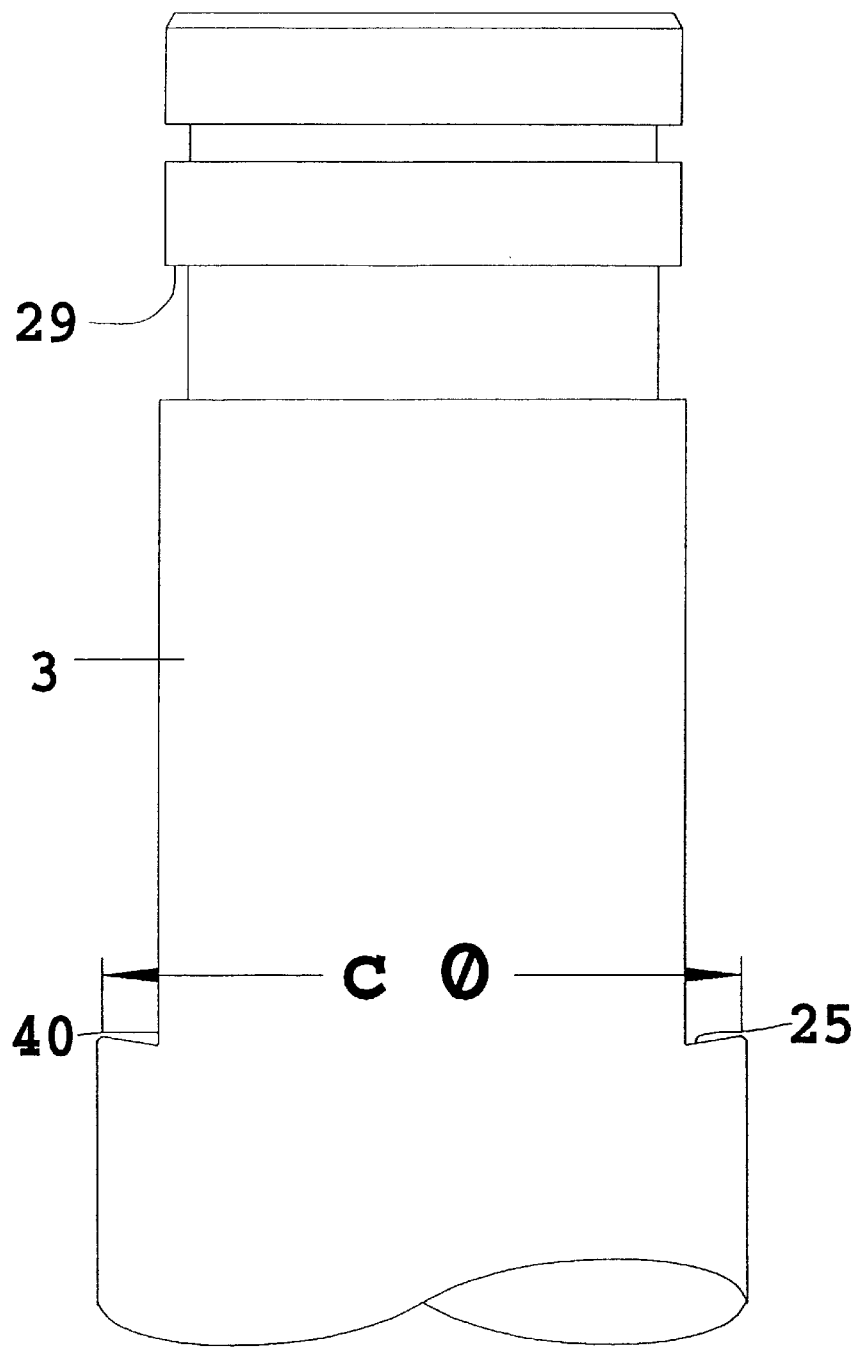
FIG. 2 is an exploded front view of a conventional conduit seal which is permanently attached to the top of a conventional thermocouple column.

The diameter "c", designated c Ø, on the conduit seal (shown in FIG. 13 and also shown in FIG. 2), the diameter "d", designated d Ø, on the upper member to be used, and angle θ can also be measured. The diameter "c" is the diameter of the highest point on the conical surface 25 on the conduit seal 3 and is actually the diameter of the circle formed by the locus of points formed by the intersection of the conical surface 25 with the small chamfer on the outer diameter of the conduit seal 3.

If the thermocouple column is stuck, measurements taken using the first two embodiments of the present invention, 30 and 42, are used to determine the size of the gap above the conical surface on the conduit seal when the upper member 1 and upper gasket(s) 4 are assembled and the hardware used to seat the upper gasket(s) has been properly assembled so that this gap can be filled by spacer means which will in turn cause the upper gasket(s) 4 to be seated when the instrument port hardware is assembled.

Figures 12, 13:
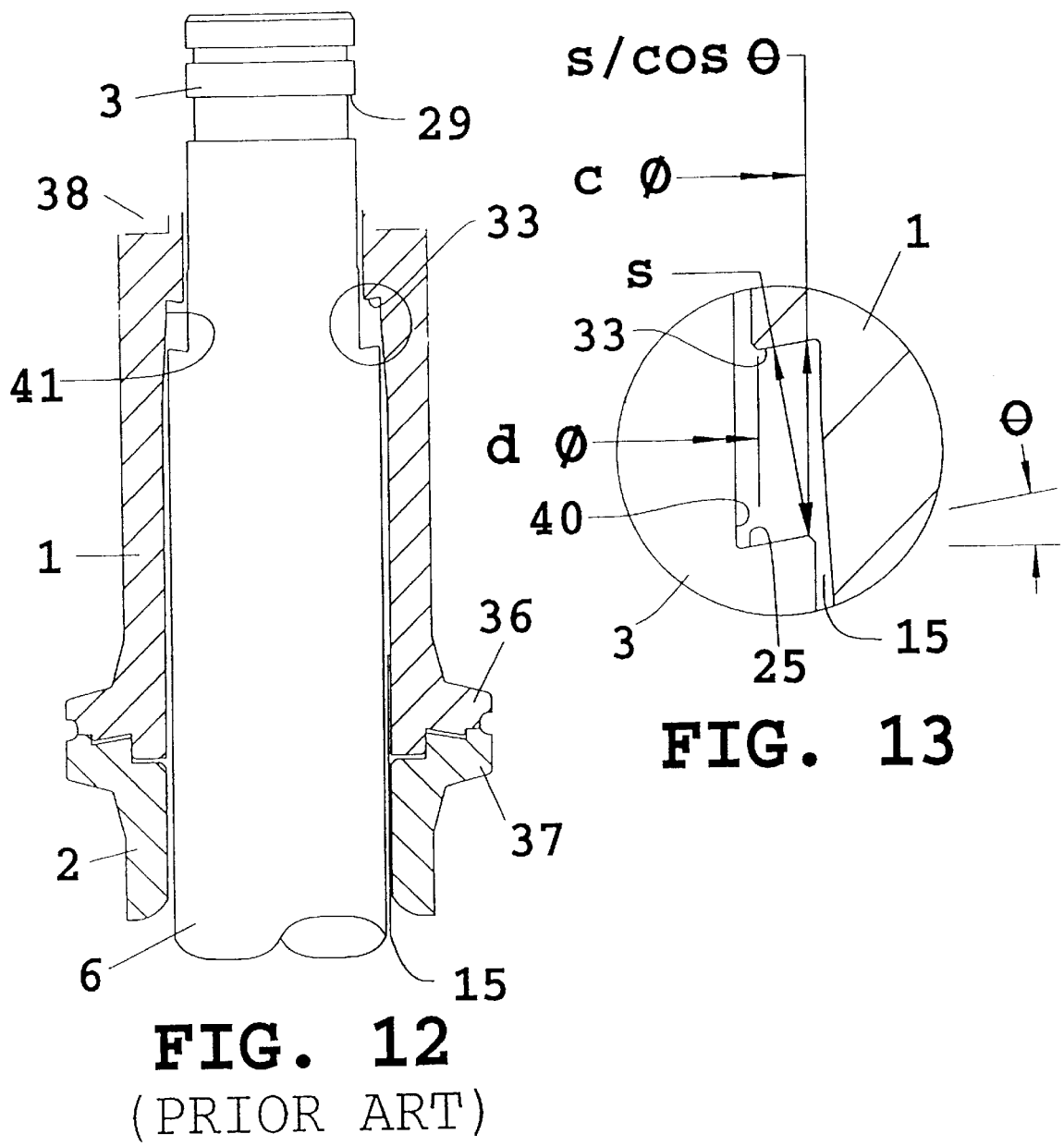
FIG. 12 is a cross-sectional view of a conventional upper and lower member with the conventional conduit seal/thermocouple column inside.
FIG. 13 is an exploded view of the conventional upper member and conduit seal at the interfaces where the spacer means may be installed.

FIG. 12 illustrates the top of a conventional thermocouple column/conduit seal where it penetrates through an upper member which is resting on a lower member. FIG. 13 shows an exploded view of the interfaces between the conical surface 25 of a conventional conduit seal 3 and the conical surface 33 of a conventional upper member 1.

Once diameters "c" and "d", gaps "f", "g", and "m", and the angle "θ" are known, from geometry we obtain the equation:

$$\frac{s}{\cos\theta} = m - (p - g) + (p - f) + .5(c - d)\tan\theta$$

where "p" is the gauge length of the second embodiment defined in FIG. 9 and "s" is the perpendicular distance between conical surfaces 25 and 33 having collinear axes. (The planar gauge means 42 can also be used to directly measure the dimensions "p-g" of the non-tubular gauge means 30 as indicated on FIG. 10 and "p-f" of the upper member 1 to be used at the stuck thermocouple column location as indicated in FIG. 11.) Consequently, $$s=(m+g-f) \cos \theta+0.5 (c-d) \sin \theta.$$

Figure 5:
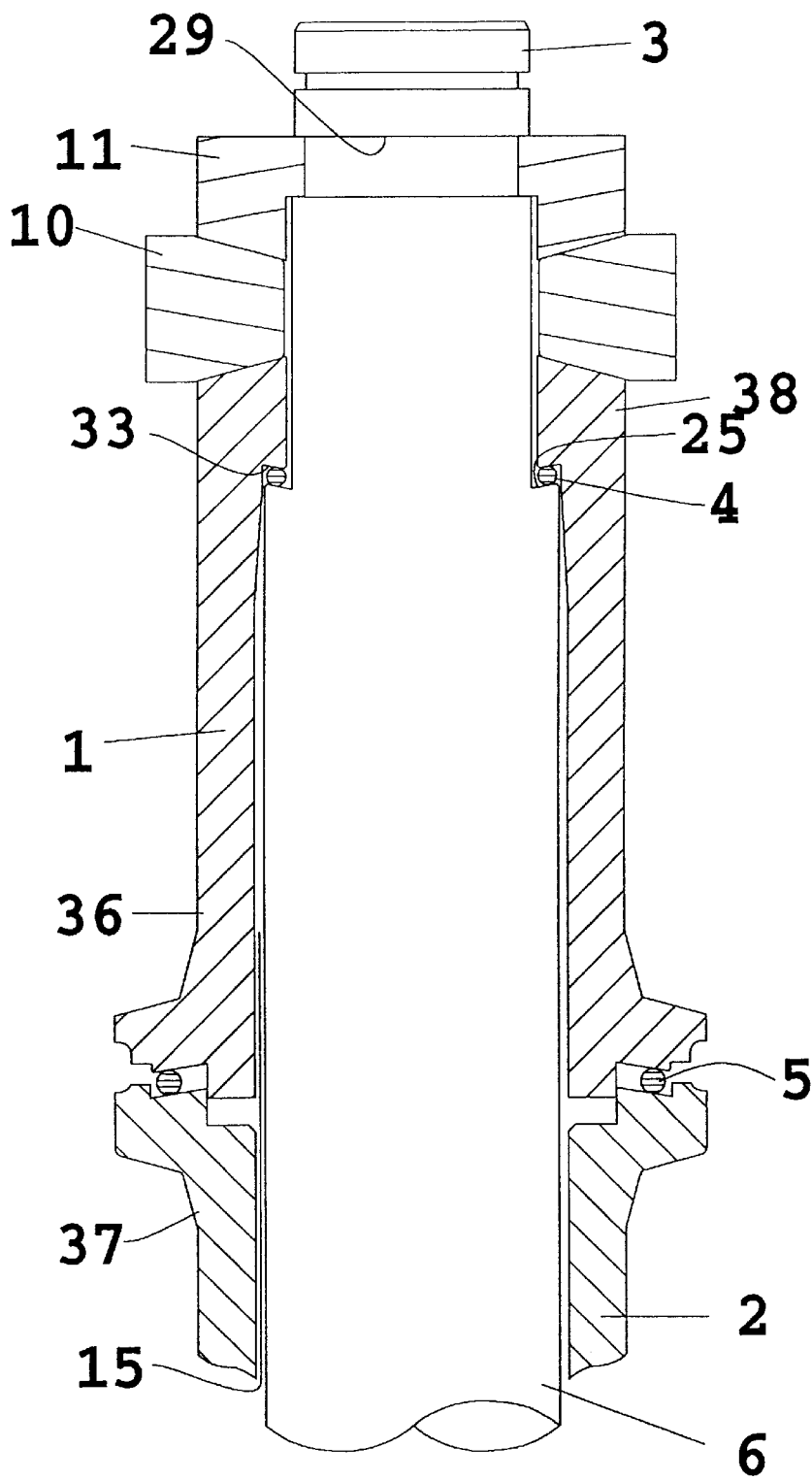
FIG. 5 is a cross-sectional view of a third embodiment of conventional instrument port hardware.
Figure 6:
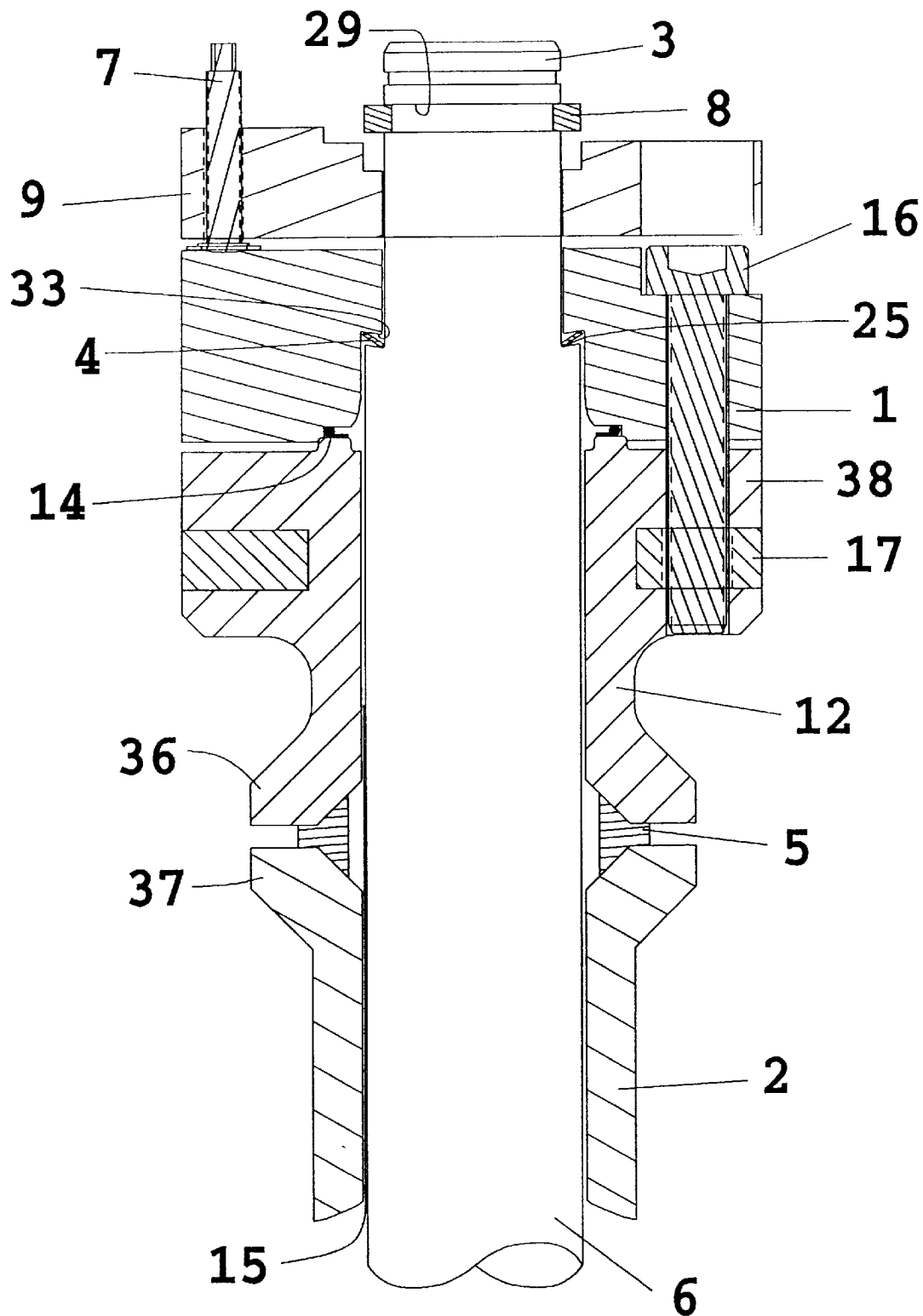
FIG. 6 is a cross-sectional view of a fourth embodiment of conventional instrument port hardware.
Figure 14:
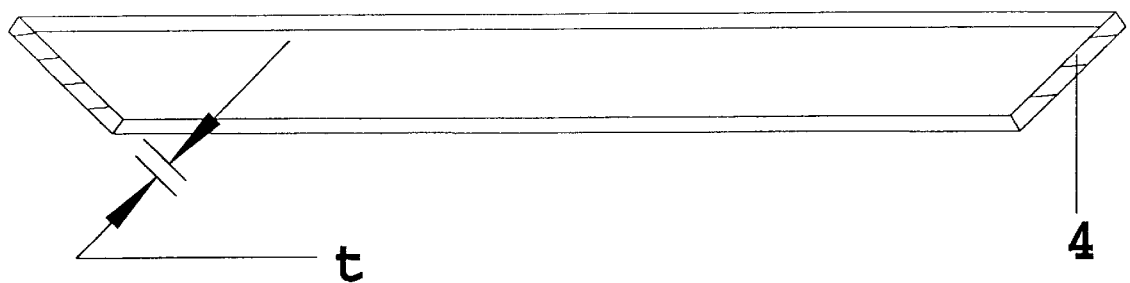
FIG. 14 is a cross-sectional view of a conventional upper gasket.

The quantity: ("s"–"t") is not calculated, where "t"=0 if the hardware in FIG. 4 is being used and "t" is the thickness of the upper gasket to be used as shown in FIG. 14 if the hardware shown in FIGS. 3, 5, or 6 is being used. If the quantity: ("s"–"t") is positive, the requisite total thickness of spacer means 35 at the stuck thermocouple column location is given by ("s"–"t"). Otherwise, no spacer means are recommended to be used. This total thickness of spacer means: ("s"–"t"), is to be measured through the thickness of the spacer means 35 in the same way that the upper gasket thickness "t" is measured in FIG. 14 and these results are applicable when the instrument port hardware is as shown in FIGS. 3 through 6 or if the instrument port hardware used is a variation of prior art using the upper gasket and upper hardware shown in FIG. 3 and the lower gasket and lower hardware shown in FIG. 4 utilized mostly in certain European plants.

In the most general case, for every upper member design used in an instrument port there exists a non-tubular gauge means design having a distinctive flat surface for interfacing with the top of the conical surface 25 of the conventional conduit seal 3 and an appropriately located surface for interfacing with part of the flanged end 37 of the lower member 2 or the lower gasket 5 so as to function as a go/no go gauge to determine whether the thermocouple column can be pulled up to seat the upper gasket. Additionally, there also exists a planar gauge means design which is adapted to enable measurement of the length of the above non-tubular gauge means and the related upper member. Consequently, for any upper member used in an instrument port with a conventional conduit seal and removed during refueling before the reactor vessel head is lifted, there exists a non-tubular gauge means and a planar gauge means which can be used to determine the gaps "f", "g", and "m" defined in FIGS. 7, 10, and 11. Since the other parameters used in the above equations are also available in the most general case, the same techniques defined above can also be used to define the quantity: ("s"–"t") which is the required thickness of spacer means to be placed in series with the upper gasket(s) when any upper member is used.

Figure 22:
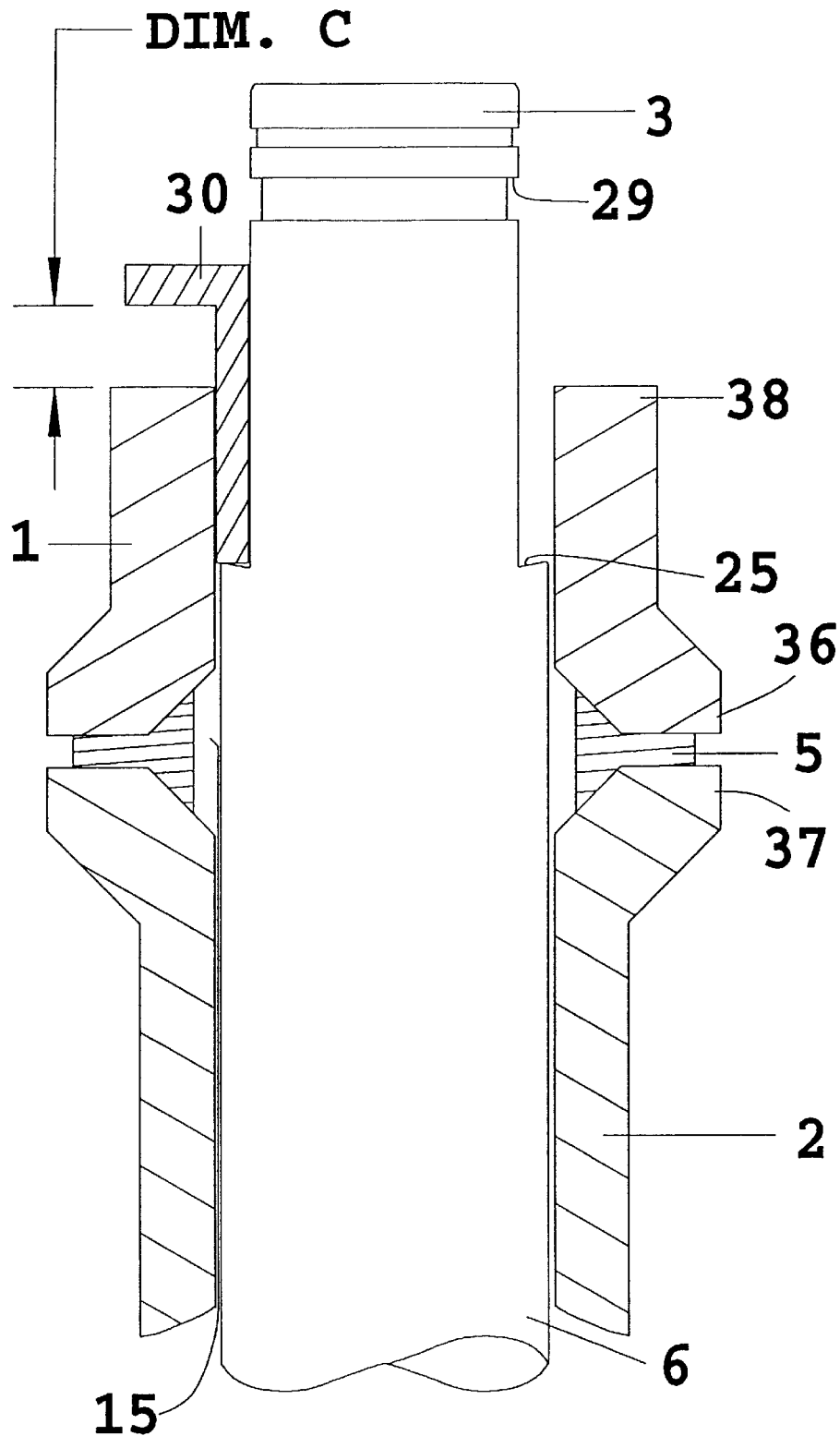
FIG. 22 shows a gauge means which is a combination of the first and second embodiments of the present invention used with a later version of the second embodiment of the conventional instrument port hardware shown in FIG. 4.

Alternately, if the instrument port hardware used is a later version of the hardware shown in FIG. 4 where the lower hardware (lower clamp, upper member 1, and lower gasket 5) is not removed prior to lifting the reactor vessel head, the non-tubular gauge means 30 and planar gauge means 42 are combined into the single gauge means shown in FIG. 22 which shows one lower gasket 5 used with this later version. (The lower gasket shown in FIG. 3 is also used in one permutation of this later version.) When this hardware is used, the gauge means 30 is assembled into the annular gap between the outer diameter of the conduit seal 3 and the inner diameter of the upper member 1 until it bottoms out against the top of the conical surface 25 on the conduit seal 3 and the gap labeled "DIM. C" is measured. The thickness of spacer means that should be placed on the conical surface 25 of the conduit seal 3 in series with the gaskets 4 is given by "t"="C"+"K" where "K" is a linear function of "DIM. C". Consequently, "t" is a linear function of "DIM. C" where the defining parameters of the linear relationship are determined by the characteristics of the gauge means used.

Figure 15:
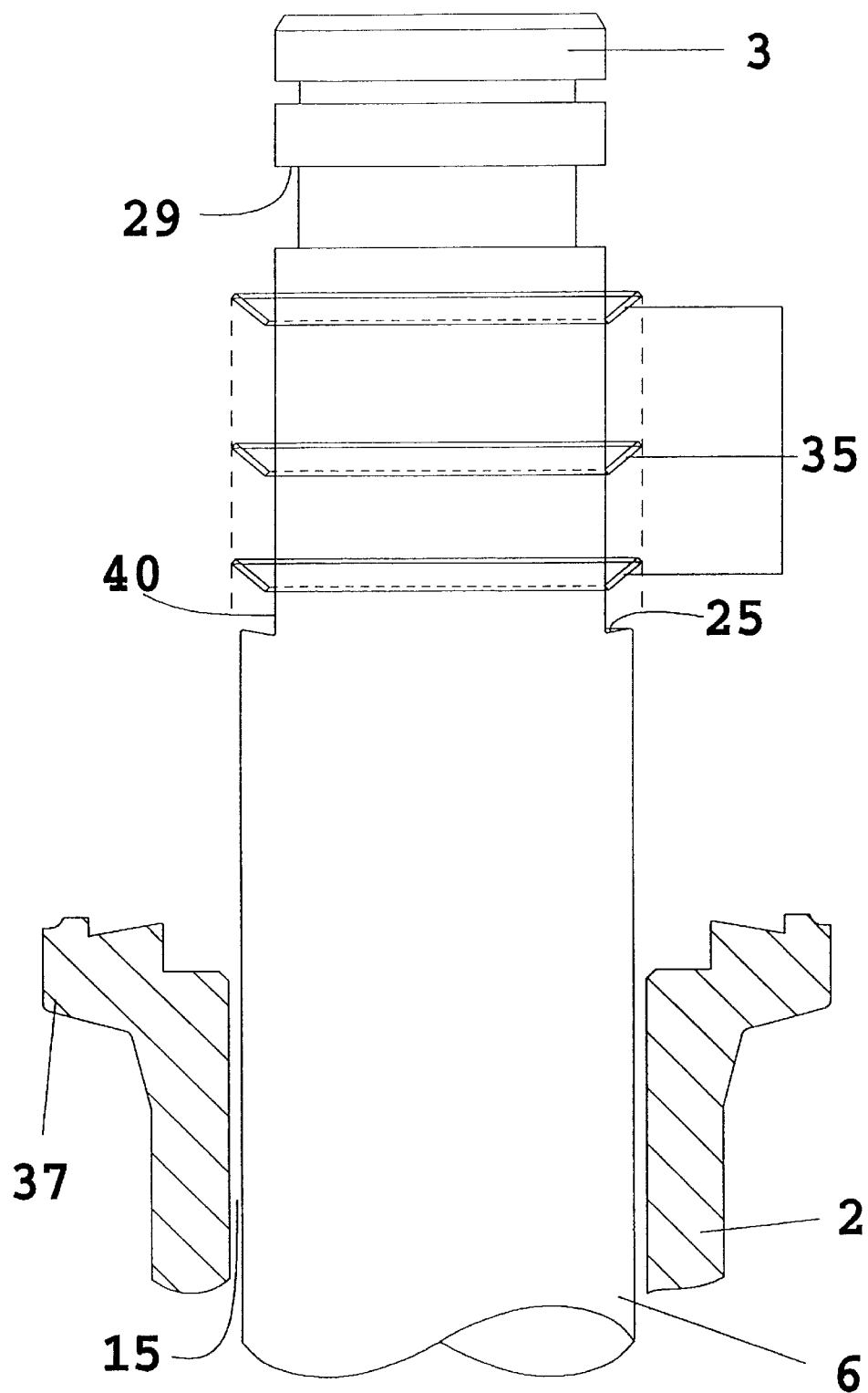
FIG. 15 is a cross-sectional view of the lower member with a conventional conduit seal/thermocouple column protruding through where a plurality of spacer means are being assembled.

FIG. 15 shows a plurality of spacer means 35 being assembled on the conduit seal 3 for use with the hardware shown for example in FIGS. 3, 4, 5, 6, 16, and 22. Various devices can be used for spacer means; these devices include spacers, other gaskets, shims, washers, or the like, however, the actual device(s) used should be designed so that they act as a catalyst during the gasket seating process—viz: their presence causes the upper gasket(s) 4 to be properly seated when the instrument port hardware is assembled but any seating load(s) of the device(s) themselves and the effect of any constraint to the gasket seating process caused by their presence should both be minimized. Once the spacer means are in place, the instrument port hardware may be assembled. The upper member is always fixed relative to the reactor vessel head when the lower clamping and securing means is assembled. If the thermocouple column is discrepantly fixed relative to the reactor vessel head, unless the column happens to be fixed at the one elevation where seating of the upper gasket(s) will simultaneously occur when the lower gasket is seated, the upper gasket(s) will not be properly seated during routine instrument port hardware assembly without the proper use of spacer means. Unless the thermocouple column is stuck high, which is not expected because assembly of the reactor vessel head should tend to force it down, judicious use of spacer means will assure that the upper and lower gaskets will be seated simultaneously.

It is emphasized that the reason for using the spacer means defined herein is to assure proper seating of at least one upper gasket during instrument port hardware assembly if the thermocouple column has been determined to be discrepantly stuck.

Conversely, if the correct thickness of spacer means is not used and the thermocouple column is stuck, the upward forces generated during hardware assembly must be greater than the friction load restraining the thermocouple column plus the weight of the thermocouple column plus the seating load of the upper gasket(s) order for at least one upper gasket to be properly seated unless the column happens to be fixed at the one elevation where seating of the upper gasket(s) will simultaneously occur when the lower gasket is seated. Depending on the magnitude of the friction forces constraining thermocouple column axial motion, it may be impossible to generate sufficient forces during hardware assembly for this to occur—a fact that has been proved repeatedly by experiences in containment.

Correct utilization of spacer means can be used with any hardware utilized with a conventional conduit seal and thermocouple column to improve upper gasket seal reliability. Slight changes may be made in the above non-tubular and planar gauge means without changing the function for which they were developed. For example, surface 31 on the non-tubular gauge means 30 could alternately be part of a conical surface instead of being flat as shown in FIG. 7 and surface 44 on the planar gauge means 43 could be beveled to facilitate fit-up with the revised surface 31. These slightly changed gauge means would still function as intended within the spirit and scope of the present invention.

FIGS. 3 through 6 illustrate an upper member 1 coupled to a lower member 2 by a conventional clamping and securing means. These clamping and securing devices have been successful in maintaining the required axial preload on the lower gasket 5 during plant operation and it should be understood that the designs shown in FIGS. 3 through 6 are merely examples of connecting means suited for use with the apparatus of the present invention, and it is further contemplated that appropriate modifications of other clamping and connecting devices for accepting the lower seal are within the current state of the art.

Furthermore, experience has shown that most leaks at instrument ports have occurred at the upper joint where the upper gaskets 4 have been improperly seated. Accordingly, alteration and modification of the prior art to define the apparatus of the present invention occurs in the hardware used to seat at least one upper gasket so as to improve upper gasket seal reliability.

FIGS. 16 through 20 illustrate the use of spacer means and the fourth embodiment of the present invention which is comprised of a retainer assembly which replaces the jack screw hardware or upper articulated hardware utilized with conventional instrument port hardware shown in FIGS. 3, 5, and 6. This retainer assembly is adapted to permit quick assembly and disassembly and to accommodate any requisite thickness of spacer means without modification. It may be necessary to slightly modify the conventional upper member 1 at the unflanged end 38 to provide for a proper interface with the retainer assembly which extends above the upper member.

Figure 19:
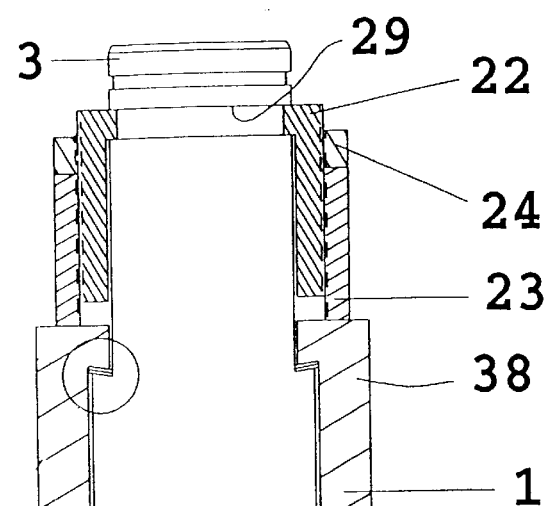
FIG. 19 is a cross-sectional view of the fourth embodiment of the present invention with a conventional upper and lower member and illustrates a spacer means installed beneath a properly seated upper gasket.
Figure 19:
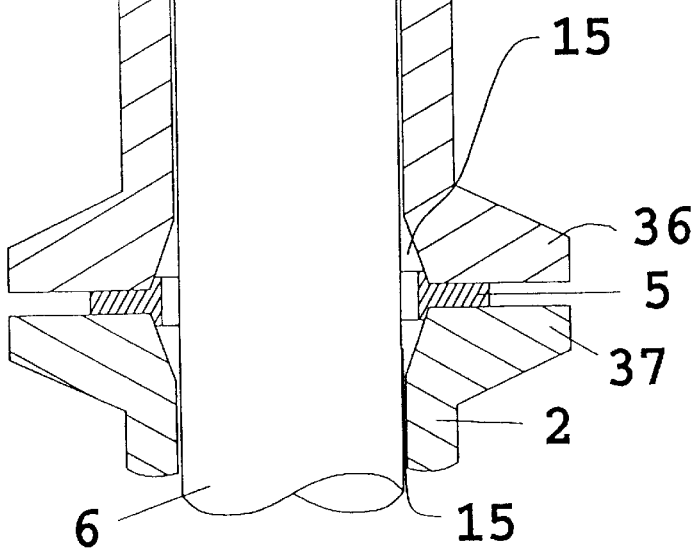

As illustrated in FIGS. 16 and 19, the retainer assembly is comprised of three threaded structural fasteners: an annular retainer 22, a hexagonal drive nut 23, and a hexagonal jam nut 24. The annular retainer 22 is tubular and axially and diametrically split so that the parts can be wrapped around the outer diameter of a conventional conduit seal. Each part of the retainer means 22 further includes an upper flange or inner ear 13 which extends inward toward the other when they are assembled. To assemble the retainer assembly, the annular retainer means 22 is placed on the conventional conduit seal causing the inner ears or flanges 13 to engage the large circumferential groove below the loading ledge 29 of the conduit seal shown in FIG. 2. The upper flange 13 on the retainer means provides for a natural stop and resting place in the large circumferential groove under surface 29 in the conduit seal 3 as shown in FIGS. 16, 18, and 19. After necessary spacers, the gaskets, upper member, lower clamping and securing means, and annular retainer means 22 are assembled on the conduit seal 3, the drive nut 23 is assembled around the outer diameter of the retainer means and torqued. This torquing action secures the annular retainer means 22 to the conduit seal 3 and seats the upper gasket 4. Then the jam nut 24 can be assembled and torqued to lock the drive nut on the retainer means which is in turn locked in place on the conduit seal.

Figure 20:
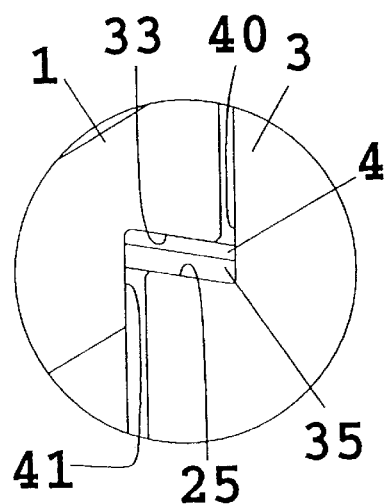
FIG. 20 is an exploded view of the interface between the conical surfaces of the conduit seal and upper member as illustrated in FIG. 19.

FIGS. 16 and 17 show the upper gasket 4 and spacer means 35 with the fourth embodiment of the present invention before the upper gasket is seated. FIG. 18 shows an exploded view of the interfaces between the retainer means and a conventional conduit seal. FIGS. 19 and 20 show the upper gasket and spacer means with the annular retainer assembly after the upper gasket has been properly seated.

Figure 21:
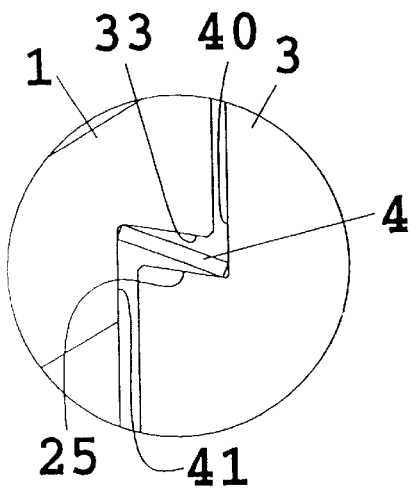
FIG. 21 is an exploded view of the interface shown in FIG. 20 without the spacer means installed and shows an improperly seated upper gasket.

If the thermocouple column shown in FIGS. 16 and 19 is assumed to be stuck in the configuration or elevation shown and the spacer means 35 is not assembled as shown, the upper gasket will not be properly seated during assembly of the retainer assembly as illustrated by FIGS. 16, 17, 19, and 20 or with any other conventional hardware. Under these conditions, although the upper member 1 shown in FIG. 16 would drop by the thickness of the "not assembled" spacer means 35 to reduce the vertical gap above the lower gasket 5 defined as DIM. B, very little further relative motion could occur and the upper gasket 4 would not be properly seated as shown in FIGS. 19 and 20 because the relative positions of the upper member 1 and conduit seal 3 would still be as shown but no spacer means 35 would be present to fill the vertical gap at the conduit seal/upper member interface where the upper gasket 4 is located. Consequently, the cone angle of the upper gasket 4 would be at some intermediate angle between that shown in FIGS. 16 and 17 and the cone angle of the properly seated upper gasket 4 in FIGS. 19 and 20. FIG. 21 shows the upper gasket without the spacer means at the intermediate cone angle and clearly, the upper gasket in FIG. 21 is not properly seated.

Conversely, use of the spacer means 35 as shown in FIGS. 16 and 17 causes the upper gasket 4 to be properly seated when the column 6 is stuck and the retainer assembly hardware defined by the fourth embodiment of the present invention is used and this is illustrated in FIGS. 19 and 20.

The upper and lower members are hollow and tubular to provide an interior volume 15 to accommodate the thermocouple column 6 and conduit seal 3. As in prior art, the conventional thermocouple column is normally used to seat the upper gasket since it is normally intended that the column will be pulled up during hardware assembly. Contrary to prior art, when this fourth embodiment of the present invention is utilized, the requisite spacer means 35 will be installed on the conical surface 25 of the conventional conduit seal 3 when the thermocouple column 6 has been found to be stuck as defined above.

The upper member 1 has a flanged end 36 and an unflanged end 38. The lower member 2 has a flanged end 37 and an unflanged end 39 (not shown) which is attached to the reactor vessel head standpipe 32. When assembled, the flanged ends 36 and 37 are designed and configured to face each other. This provides for the flanged ends to extend outwardly from the upper and lower members to provide room for the lower gasket 5 and exterior flanged surfaces adapted to react clamp/flange interface loads. The flanged ends of both members are coupled and secured via a conventional clamping and securing means (not illustrated).

The unflanged end of the upper member 1 includes an interiorly located conical surface 33 which is adapted to correctly accommodate an upper gasket 4 during plant operation. Once assembled, the upper gasket 4 will be properly seated inside the ring-shaped volume bounded by the conical surface 33 and the inner diameter 41 of the upper member 1 and the conical surface 25 and the outer diameter 40 of the conduit seal 3 and it will seal provided a properly designed upper gasket and good mechanical practice is used during assembly. The requisite spacer means will be installed using techniques defined above when the thermocouple column is stuck.

The design and configuration of the hardware illustrated in FIGS. 16 through 20 and the method discussed herein will render a problem-free system provided properly-designed gaskets and good mechanical practices are used during instrument port hardware assembly. Most utilities will still usually have to disassemble and reassemble the instrument port hardware during refueling, however, time will be saved during this work when the present invention is used. Since the retainer assembly comprises an annular retainer means 22 and hexagonal nuts 23 and 24 and will accommodate use of any necessary number of spacers without any hardware modification, further time and money will be saved when a stuck column problem is defined and the retainer assembly is assembled in the instrument port.

The above described embodiments enable the instrument port hardware to be assembled and disassembled quickly using only ordinary hand tools. Use of the preferred embodiments will result in increased sealing reliability and reduced maintenance costs and personnel radiation exposure since unlike prior art, the leak mechanism caused by stuck thermocouple columns is eliminated and the suggested hardware can be assembled and disassembled very quickly.

While the invention has been particularly shown and described with reference to embodiments thereof, it will be understood by those skilled in the art that various changes in form and detail may be made without departing from the spirit and scope of the invention.

The following table lists the part numbers and part descriptions as used herein and in the drawings attached hereto.

PARTS LIST

| Feature Number | Description |
| --- | --- |
| 1 | upper member or flange |
| 2 | lower member or flange |
| 3 | conduit seal |
| 4 | upper gasket(s) |
| 5 | lower gasket |
| 6 | thermocouple column |
| 7 | jack screw |
| 8 | split ring |
| 9 | jack screw plate |
| 10 | upper articulated clamp |
| 11 | upper positioner |
| 12 | intermediate flange |
| 13 | internal ear (flange) on annular retainer |
| 14 | intermediate gasket |
| 15 | interior of upper and lower members |
| 16 | capscrews |
| 17 | annular mounting piece |
| 18 | actuator drive sleeve |
| 19 | actuator drive nut |
| 20 | annular thrust bearing |
| 21 | split ring collar |
| 22 | annular retainer |
| 23 | hexagonal drive nut |
| 24 | hexagonal jam nut |
| 25 | conduit seal conical surface |
| 26 | reactor vessel head |
| 27 | upper support (reactor internals) |
| 28 | reactor vessel |
| 29 | conduit seal loading ledge |
| 30 | non-tubular gauge means |
| 31 | measuring surface, non-tubular gauge means |
| 32 | reactor vessel head standpipe/penetration |
| 33 | upper member internal conical surface |
| 34 | thermocouple conduit |
| 35 | spacer means |
| 36 | flanged end of upper member |
| 37 | flanged end of lower member |
| 38 | unflanged end of upper member |
| 39 | unflanged end of lower member |
| 40 | conduit seal upper gasket seating surface |
| 41 | upper member upper gasket seating surface |
| 42 | planar gauge means |
| 43 | ledge on non-tubular gauge means |
| 44 | upper surface of planar gauge means |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for seating at least one gasket member used to seal a pressure vessel penetration where a column penetrates therethrough, the system comprising:

a) a tubular flange member;
   b) a column which penetrates through the tubular member in a telescoping manner and is normally movable axially relative to and in axial sliding communication with said tubular member before assembly of hardware used to seat said at least one gasket member;
   c) said at least one gasket member for sealing the interfaces between said tubular member and said column;
   d) spacer means for filling at least one axial gap between the column and the tubular flange member with said at least one gasket member when properly seated between said column and said tubular member and the at least one properly seated gasket member when said column cannot be suitably positioned axially relative to the said tubular member in order to properly seat said at least one gasket member during assembly of hardware utilized to seat said at least one gasket member;

e) a first gauge means for testing whether said column can be positioned axially so that said at least one gasket member is properly seated during assembly of hardware used to seat said at least one gasket member; and f) a second gauge means used in conjunction with said first gauge means when said column may not be suitably positioned, for determining the as-built lengths of said first gauge means and said tubular member to be used, the thickness of said spacer means to be placed in series with said at least one gasket member so that after assembly of hardware used to seat said at least one gasket member, the axial gap in series with said at least one properly-seated gasket member is filled by this spacer means thus causing proper preloading and seating of said at least one said gasket member.

2. The system in claim 1, further comprising:

a) a first split threaded structural fastener adapted to be in communication with second and third fasteners and interface with said column in order to transfer assembly and plant operating loads to and from said column and said second fastener through structural interfaces between said fasteners and said column;

b) a second threaded structural fastener adapted to be in interface with said first fastener and said tubular member to transfer assembly and plant operating loads, and generate sufficient axial loads to properly seat said at least one gasket member when it is assembled on said first fastener and torqued, and be located adjacent to and interface with the third fastener; and c) said third fastener adapted to be in communication with said first fastener and interface with said second fastener so as to act as a locking device for securing said first fastener to said column and said tubular member in place until the three fasteners are disassembled.

3. A system used to seal a pressure vessel penetration where a column passes through telescopically, comprising at least:

a) a first tubular flange member;

b) a column which may be discrepantly stuck;

c) at least one first gasket member for sealing interfaces between said first tubular flange member and said column;

d) means to properly seat said at least one first gasket member if said column is then suitably positioned relative to said first tubular flange member; and e) spacer means for filling a gap next to said at least one first gasket member when properly seated and if said column is improperly stuck and the extent of such gap being defined using gaging means for causing proper seating of said at least one first gasket member when a first hardware set is correctly assembled.

4. A system used to seal a pressure vessel penetration where a column passes through telescopically, comprising at least:

a) a first tubular flange member;

b) a second tubular flange member;

c) a column which may be discrepantly (improperly) stuck:

d) at least one first gasket member for sealing interfaces between said first tubular flange member and said column;

e) at least one second gasket member for sealing interfaces between said first tubular flange member and said second tubular flange member;

f) a first hardware set adapted to properly seat said at least one first gasket member if said column is then suitably positioned relative to said first tubular flange member;

g) a second hardware set adapted to properly seat said at least one second gasket member; and h) spacer means for filling gap(s) next to said at least one first gasket member when properly seated and if said column is improperly stuck, and the extent of such gap(s) being defined using gaging means, and the presence of these spacer means causing proper seating of said at least one first gasket member and said at least one second gasket member when said first hardware set and said second hardware set are correctly assembled.

5. The system in claim 4 additionally comprising a first gauging means used to determine if said column is not improperly stuck and can be suitably repositioned relative to said first tubular flange member so that said at least one first gasket member can be properly seated during assembly of said first hardware set.

* * * * *